United States Patent
El-Rayis et al.

(10) Patent No.: US 10,763,929 B2
(45) Date of Patent: Sep. 1, 2020

(54) METHOD AND STEERABLE ANTENNA APPARATUS

(71) Applicant: SOFANT TECHNOLOGIES LTD, Edinburgh (GB)

(72) Inventors: Ahmed Osman El-Rayis, Edinburgh (GB); Nakul Haridas, Edinburgh (GB); Tughrul Sati Arslan, Edinburgh (GB)

(73) Assignee: SOFANT TECHNOLOGIES LTD, Edinburgh (GB)

( * ) Notice: Subject to any disclaimer, the term of this patent is extended or adjusted under 35 U.S.C. 154(b) by 173 days.

(21) Appl. No.: 16/065,297

(22) PCT Filed: Dec. 9, 2016

(86) PCT No.: PCT/GB2016/053909
§ 371 (c)(1),
(2) Date: Jun. 22, 2018

(87) PCT Pub. No.: WO2017/109456
PCT Pub. Date: Jun. 29, 2017

(65) Prior Publication Data
US 2020/0136696 A1    Apr. 30, 2020

(30) Foreign Application Priority Data

Dec. 23, 2015 (GB) .................................. 1522722.6

(51) Int. Cl.
*H04B 7/0413* (2017.01)
*H04W 16/28* (2009.01)
(Continued)

(52) U.S. Cl.
CPC ............ *H04B 7/0617* (2013.01); *G01S 1/042* (2013.01); *G01S 1/045* (2013.01); *H01Q 3/2611* (2013.01);
(Continued)

(58) Field of Classification Search
CPC .... H04B 7/0617; H04B 7/0404; H04B 7/043; H04W 52/283; H04W 52/0251;
(Continued)

(56) References Cited

U.S. PATENT DOCUMENTS 5,680,141 A    10/1997 Didomenico et al.
6,172,642 B1   1/2001  DiDomenico et al.
(Continued)

FOREIGN PATENT DOCUMENTS

EP    0 247 780    12/1987
EP    0 397 916    11/1990
(Continued)

OTHER PUBLICATIONS

International Search Report and Written Opinion for PCT/GB2016/053909 dated Mar. 16, 2017 (18 pages).
(Continued)

*Primary Examiner* — Andrew Wendell
(74) *Attorney, Agent, or Firm* — Nixon & Vanderhye PC

(57) ABSTRACT

The invention provides a method of adjusting a principal communication direction of a steerable directional antenna for communicating with a terrestrial electromagnetic signal source, the method comprising: providing location specific steering data comprising one or more steering data portions, each of the steering data portions being specific to a respective location; determining a location of the steerable directional antenna; selecting a steering data portion from the location specific steering data taking into account the determined location of the antenna; determining an adjusted principal communication direction of the steerable directional antenna taking into account the said selected steering data portion; and adjusting the principal communication direction of the steerable directional antenna in accordance with the said adjusted principal communication direction.

32 Claims, 5 Drawing Sheets

(51) Int. Cl.
*H04B 7/06* (2006.01)
*G01S 1/04* (2006.01)
*H01Q 3/26* (2006.01)
*H04B 7/0404* (2017.01)
*H04W 52/28* (2009.01)

(52) U.S. Cl.
CPC ........ *H04B 7/0404* (2013.01); *H04W 52/283* (2013.01)

(58) Field of Classification Search
CPC ........ H04W 16/28; G01S 1/042; G01S 1/045; H01Q 3/2611
See application file for complete search history.

(56) References Cited

U.S. PATENT DOCUMENTS

| | | | |
|---|---|---|---|
| 6,184,825 B1 | 2/2001 | Wehner et al. | |
| 6,195,559 B1 | 2/2001 | Rapeli et al. | |
| 6,229,486 B1 | 5/2001 | Krile | |
| 6,285,893 B1 | 9/2001 | Keirinbou | |
| 6,333,712 B1 | 12/2001 | Haugse et al. | |
| 6,445,308 B1* | 9/2002 | Koike | G01S 11/04 340/902 |
| 6,535,734 B1 | 3/2003 | Miller et al. | |
| 6,819,245 B1* | 11/2004 | Dilling | B60R 25/102 340/435 |
| 7,031,368 B1* | 4/2006 | Maruta | H04B 7/0615 375/130 |
| 7,373,127 B2 | 5/2008 | Reed | |
| 8,248,318 B2* | 8/2012 | Wahlberg | H01Q 1/02 343/757 |
| 2001/0020918 A1 | 9/2001 | Takai | |
| 2002/0175859 A1 | 11/2002 | Newberg et al. | |
| 2003/0034916 A1 | 2/2003 | Kwon et al. | |
| 2003/0043071 A1 | 3/2003 | Lilly et al. | |
| 2003/0117315 A1 | 6/2003 | Graham | |
| 2003/0179138 A1 | 9/2003 | Chen | |
| 2003/0228857 A1 | 12/2003 | Maeki | |
| 2004/0017310 A1 | 1/2004 | Vargas-Hurlston et al. | |
| 2005/0059388 A1 | 3/2005 | Haines et al. | |
| 2006/0152410 A1 | 7/2006 | Shi | |
| 2007/0205943 A1 | 9/2007 | Nassiri-Toussi et al. | |
| 2008/0018534 A1 | 1/2008 | Wu | |
| 2008/0150798 A1 | 6/2008 | Curry et al. | |
| 2008/0268790 A1 | 10/2008 | Shi et al. | |
| 2008/0268865 A1 | 10/2008 | Tung | |
| 2009/0143038 A1 | 6/2009 | Saito | |
| 2009/0322610 A1 | 12/2009 | Hants et al. | |
| 2010/0013708 A1 | 1/2010 | Paynter | |
| 2010/0124210 A1 | 5/2010 | Lo | |
| 2010/0164802 A1* | 7/2010 | Li | H04B 7/0695 342/372 |
| 2010/0168817 A1 | 7/2010 | Yamamoto et al. | |
| 2010/0178884 A1 | 7/2010 | Nassiri-Toussi et al. | |
| 2010/0197261 A1 | 8/2010 | Zibrik et al. | |
| 2010/0207738 A1 | 8/2010 | Bloy | |
| 2011/0136493 A1 | 6/2011 | Dimpflmaier et al. | |
| 2011/0250928 A1 | 10/2011 | Schlub et al. | |
| 2012/0257585 A1* | 10/2012 | Sydor | H04W 72/082 370/329 |
| 2013/0040655 A1 | 2/2013 | Keidar | |
| 2013/0040682 A1 | 2/2013 | Chang et al. | |
| 2013/0156080 A1 | 6/2013 | Cheng et al. | |
| 2013/0231066 A1 | 9/2013 | Zander et al. | |
| 2014/0086191 A1* | 3/2014 | Berntsen | H04B 7/10 370/329 |
| 2016/0037231 A1* | 2/2016 | MacKenzie | H04N 21/235 725/123 |
| 2017/0273034 A1* | 9/2017 | Colombi | H04W 52/367 |

FOREIGN PATENT DOCUMENTS

| | | |
|---|---|---|
| EP | 0 635 900 | 1/1995 |
| EP | 1 079 296 | 2/2001 |
| EP | 1 369 954 | 12/2003 |
| EP | 1 717 969 | 11/2006 |
| GB | 2 382 927 | 6/2003 |
| GB | 2 433 859 | 7/2007 |
| GB | 2 444 538 | 6/2008 |
| GB | 2 445 106 | 6/2008 |
| GB | 2 468 731 | 9/2010 |
| WO | 98/29968 | 7/1998 |
| WO | 99/16221 | 4/1999 |
| WO | 01/35537 | 5/2001 |
| WO | 02/063904 | 8/2002 |
| WO | 2006/065493 | 6/2006 |
| WO | 2010/106414 | 9/2010 |
| WO | 2013/022161 | 2/2013 |
| WO | 2013/023187 | 2/2013 |
| WO | 2013/120536 | 8/2013 |
| WO | 2015/183472 | 12/2015 |
| WO | 2017/109456 | 6/2017 |

OTHER PUBLICATIONS

GB Search Report dated Apr. 1 2016 issued in GB 1522722.6 (5 pages).

* cited by examiner

|     | Location | Steering Data |     |
|-----|----------|---------------|-----|
| 26 → | X1, Y1, Z1 | A1, B1, C1 | ← 24 |
| 26 → | X2, Y2, Z2 | A2, B2, C2 | ← 24 |
| 26 → | X3, Y3, Z3 | A3, B3, C3 | ← 24 |
| 26 → | Xn, Yn, Zn | An, Bn, Cn | ← 24 |
Fig. 5
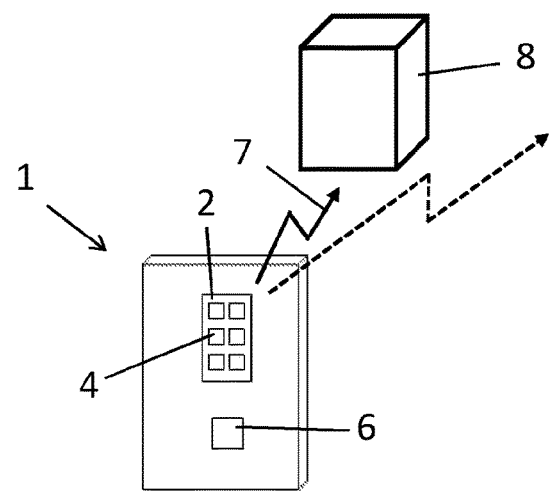
Fig. 6
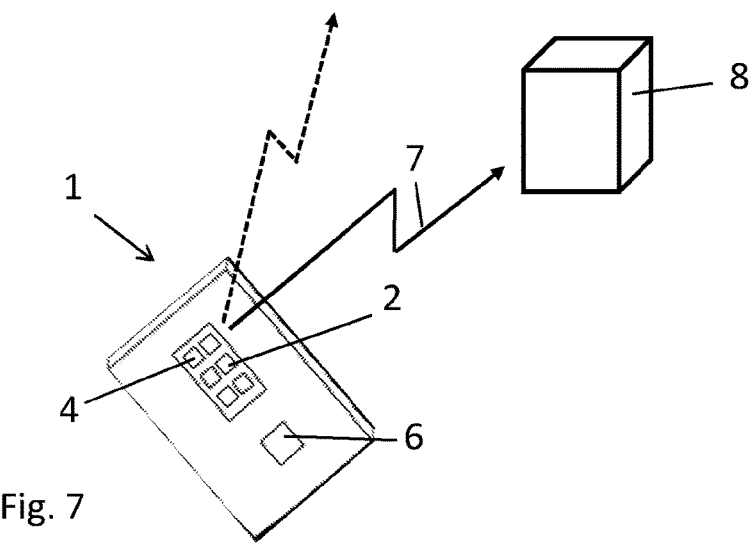
Fig. 7

ABSTRACT# METHOD AND STEERABLE ANTENNA APPARATUS

This application is the U.S. national phase of International Application No. PCT/GB2016/053909 filed 9 Dec. 2016, which designated the U.S. and claims priority to GB Patent Application No. 1522722.6 filed 23 Dec. 2015, the entire contents of each of which are hereby incorporated by reference.

FIELD OF THE INVENTION

The invention relates to: a method of adjusting a principal communication direction of a steerable directional antenna for communicating with a terrestrial electromagnetic signal source; steerable directional antenna apparatus; and a method of generating location specific steering data for a steerable directional antenna.

BACKGROUND TO THE INVENTION

Mobile communications devices use antennas for radio frequency wireless communication with terrestrial electromagnetic signal sources, such as cellular network base stations, Wi-fi access points and Bluetooth beacons. The strengths of signals received by the antennas from such electromagnetic signal sources vary greatly in dependence on the spatial relationship between the mobile device and the signal source. The received signal strength is typically a function of distance and direction of the mobile device from the electromagnetic signal source, but the function can be more complex when obstructions are provided in the line of sight between the mobile device and the electromagnetic signal source, and when multi-path propagation occurs, for example due to signal reflections.

In order to reduce interference, and therefore improve transmission and reception of electromagnetic signals by the antennas, it is known to provide a directional antenna and to steer the antenna in the direction of the electromagnetic signal source. However, when mobile devices move, the antenna often needs to be steered back towards the electromagnetic signal source to maintain a wireless communications link of the required quality. This can require the antenna to perform a scan by (electronically or mechanically) steering the principal communication direction of the antenna across a range of directions in order to determine an optimum principal communication direction along which to communicate with the electromagnetic signal source, particularly when the antenna is not initially in communication with the electromagnetic signal source (which may require the scan to be performed over a larger range). This scanning process typically takes time and uses a significant quantity of battery power.

Accordingly a new way of steering steerable directional antennas, which reduces the battery power consumption, is required.

SUMMARY OF THE INVENTION

A first aspect of the invention provides a method of adjusting a principal communication direction of a steerable directional antenna for communicating with a terrestrial electromagnetic signal source, the method comprising: providing location specific steering data comprising one or more steering data portions, each of the steering data portions being specific to a respective (typically absolute) location; determining a location of the steerable directional antenna; selecting a steering data portion from the location specific steering data taking into account the determined location of the antenna (e.g. a steering data portion associated with the determined location); determining an adjusted principal communication direction of the steerable directional antenna taking into account the said selected steering data portion; and adjusting the principal communication direction of the steerable directional antenna in accordance with the said adjusted principal communication direction.

A second aspect of the invention provides steerable directional antenna apparatus comprising: a steerable directional antenna for communicating with a terrestrial electromagnetic signal source; a memory comprising location specific steering data comprising one or more steering data portions, each steering data portion being specific to a respective location; and a controller comprising one or more computer processors, the controller being configured to: determine (e.g. receive) a location of the steerable directional antenna; select a steering data portion from the location specific steering data taking into account the determined location of the antenna (e.g. a steering data portion associated with the determined location); determine an adjusted principal communication direction of the steerable directional antenna taking into account the said selected steering data portion; and adjust the principal communication direction of the steerable directional antenna in accordance with the said adjusted principal communication direction.

It will be understood that the controller of the second aspect of the invention may be configured to perform any steps of the method of the first aspect of the invention.

The selected steering data portion is typically specific to the determined location of the antenna. In other cases, the selected steering data portion is specific to a future location of the antenna predicted taking into account the said determined location of the antenna.

A change in the location of the antenna affects the direction of the (typically fixed position) terrestrial electromagnetic signal source relative to the antenna. The location of the antenna also affects the signal propagation path (and therefore the signal attenuation and signal reflections incurred over the signal propagation path) taken by electromagnetic signals between the antenna and the terrestrial electromagnetic signal source. By selecting a steering data portion taking into account the determined location of the antenna and adjusting the principal communication direction of the steerable directional antenna taking into account the said selected steering data portion, the antenna can be brought into communication with the electromagnetic signal source (or the quality of the communications link between the antenna and the electromagnetic signal source can be improved) without having to perform a full scan of detectable electromagnetic signal sources when the antenna changes location (thereby saving processing and battery power). In addition, the steerable directional antenna can be steered towards a preferred communication direction for communicating with the terrestrial electromagnetic signal source much more quickly than if a full scan of detectable electromagnetic signal sources was required. This also helps to reduce the quantity of signal processing required thereby reducing electrical power consumption.

It may be that one or more or each of the steering data portions comprises data from which the adjusted principal communication direction of the antenna can be determined. For example, it may be that the said steering data portions comprise the locations (e.g. a map) of one or more terrestrial (typically RF) electromagnetic signal sources with which the antenna can communicate (e.g. from the location with which the said steering data portion is associated). Typically the said electromagnetic signal sources include the said terrestrial electromagnetic signal source. It may be that the method comprises: determining the adjusted principal communication direction of the antenna taking into account the location of the terrestrial electromagnetic signal source obtained from the selected steering data portion.

It may be that one or more or each of the said steering data portions comprises configuration data for adjusting the principal communication direction of the antenna, the said configuration data being specific to a location with which the said steering data portion is associated. For example, the configuration data may comprise (individually selectable) beamforming phase shift coefficients and/or weightings to be applied to signals transmitted from or received by each of a plurality of antenna elements of the antenna. Alternatively the configuration data may identify sectors of a sector antenna to be activated (and optionally deactivated). Alternatively the configuration data may identify a rotational orientation of a mechanically rotatable antenna. In this case, the step of determining the adjusted principal communication direction comprises receiving said configuration data, typically specific to a current or predicted future location of the antenna. The said configuration data may then be adapted if necessary taking into account one or more additional parameters (e.g. orientation, usage mode, sensor signals—see below) before being applied to the antenna.

It may be that the locations to which the respective steering data portions are specific are points or loci of points in space. The said points or loci may be represented, for example, by (two-dimensional or three-dimensional) location co-ordinates (e.g. longitude, latitude and, for three dimensional co-ordinates, altitude) or one or more ranges of (two-dimensional or three-dimensional) location co-ordinates.

It may be that one or more or each of the steering data portions is specific to a user of a device comprising the antenna.

Typically one or more or each of the steering data portions are derived from prior activity of a user (typically at each of the said respective locations).

It may be that one or more or each of the steering data portions are derived from prior usage of the antenna by a user (typically at each of the said respective locations).

It may be that the said location specific steering data is provided in a user profile (typically stored on the said memory) which is customised for the user.

Typically the method comprises dynamically updating (or the controller is configured to dynamically update) the location specific steering data (e.g. using the method according to the third aspect of the invention or the apparatus according to the fourth aspect of the invention) using steering data derived from activity of the user (e.g. usage of the antenna by the user).

Typically the controller is configured to obtain data from the user profile stored on the said memory. Typically the controller is configured to dynamically update the user profile stored on the said memory using steering data specific to each of one or more locations derived from activity of the user (e.g. (ongoing) usage of the antenna by the user).

It may be that the method further comprises selecting (or the controller is configured to select) a said steering data portion from the location specific steering data and/or determining (or the controller is configured to determine) the said adjusted principal communication direction of the steerable directional antenna taking into account sensor data from one or more sensors (typically from one or more sensors of a or the device comprising the antenna).

It may be that the steerable antenna apparatus further comprises said one or more sensors. It may be that the controller is configured to receive sensor data from the said one or more sensors.

It may be that one or more or each of the steering data portions is associated with one or more sensor conditions. It may be that the method comprises determining (or the controller is configured to determine) whether the one or more sensor conditions are met by processing the said sensor data and selecting (or the controller is configured to select) a said steering data portion associated with the said sensor conditions, responsive to a determination that the said sensor conditions are met.

Alternatively, it may be that the method comprises processing (or the controller is configured to process) the selected steering data portion together with the sensor data to determine the said adjusted principal communication direction of the steerable directional antenna.

The sensors may comprise any one or more (typically any two or more or each) of the following: orientation sensor configured to determine the orientation of the antenna; proximity sensor configured to determine proximity of one or more external objects to the antenna (or to determine whether one or more external objects are in close proximity to the antenna); temperature sensor configured to determine a temperature of an external surface of a housing of a device comprising the antenna; a pressure sensor configured to determine a physical pressure exerted on an external surface of a housing of a device comprising the antenna; headphone sensor configured to determine whether headphones are coupled to a headphone port of the device comprising the antenna; and a usage mode sensor configured to determine a usage mode of the device comprising the antenna.

The sensors may be implemented in software (e.g. a usage mode sensor may be a signal from an operating system running on the device indicating whether the device is being used to make a call), in hardware (e.g. a pressure sensor may be provided on the housing of the device) or in a combination of hardware and software.

It will be understood that the orientation of the antenna also affects the direction of the terrestrial electromagnetic signal source relative to the antenna. Accordingly, by taking into account the orientation of the antenna, more accurate steering data can be selected from the location specific steering data.

It may be that the method further comprises: determining (or the controller is configured to determine) an orientation of the antenna (e.g. pitch and/or yaw and/or roll of the antenna); and selecting (or the controller is configured to select) the said selected steering data portion from the location specific steering data taking into account (e.g. associated with) the determined orientation of the antenna (e.g. relative to the electromagnetic signal source).

It may be that the method comprises determining (or the controller is configured to determine) an orientation of the antenna relative to the said terrestrial electromagnetic signal source and selecting (or the controller is configured to select) the said steering data portion from the location specific steering data taking into account the determined orientation of the antenna relative to the electromagnetic signal source.

It may be that one or more or each of the steering data portions is associated with a respective orientation (e.g. with a particular pitch, yaw and roll) of the antenna. It may be that the said selected steering data portion is associated with the determined orientation of the antenna.

Typically the step of determining an orientation of the antenna comprises determining (or the controller is configured to determine) the orientation of the antenna from sensor data provided by one or more orientation sensors configured to measure the orientation of the antenna. For example, it may be that the method comprises measuring (or the controller is configured to measure) the orientation of the antenna using sensor data from one or more of: an accelerometer; a gyroscope; a magnetometer; a compass (e.g. provided on a or the device comprising the antenna).

Typically the steerable antenna apparatus comprises one or more sensors configured to measure or calculate the orientation of the antenna (or a or the device comprising the antenna). Typically the steerable antenna apparatus comprises one or more of the following configured to measure the orientation of the antenna: an accelerometer; a gyroscope; a magnetometer; a compass. It may be that the controller is configured to determine an orientation of the antenna from sensor data provided by the said sensors.

It may be that the method further comprises: determining (or the controller is configured to determine) an orientation of the antenna; and determining (or the controller is configured to determine) the said adjusted principal communication direction of the steerable directional antenna taking into account the determined orientation of the antenna.

It may be that the selected steering data portion is associated with a particular orientation of the antenna, which may or may not be the same orientation as the determined orientation of the antenna. By taking into account both the selected steering data portion and the orientation of the antenna to determine the adjusted principal communication direction, an adjusted principal communication direction of the antenna can be determined which provides a higher quality wireless link with the electromagnetic signal source (particularly when the orientation with which the selected steering data portion is associated is not the same as the determined orientation of the antenna).

It may be that the method further comprises selecting (or the controller is configured to select) the said steering data portion from the location specific steering data, and/or determining (or the controller is configured to determine) the said adjusted principal communication direction of the steerable directional antenna, taking into account sensor data from one or more proximity sensors (e.g. one or more proximity sensors of a device comprising the antenna). The sensor data may be indicative of a proximity of an object to the antenna and/or that an object is in close proximity to the antenna. The sensor data may be indicative of a proximity value within a (typically continuous) range of candidate proximity values, or the sensor data may be indicative of a binary decision as to whether there is an object in close proximity of the antenna.

It may be that the steerable antenna apparatus comprises one or more proximity sensors, typically configured to determine the proximity of one or more (typically external) objects to the antenna (e.g. by detecting the proximity of one or more objects to a or the device comprising the antenna and the proximity sensor(s)), the said object(s) being external to the device) or to determine whether one or more objects are in close proximity to the antenna.

When an (typically external) object (such as the user of the device comprising the antenna) is in close proximity to the antenna, it is typically preferable to direct the antenna radiation away from the object to improve the quality of communication with the electromagnetic signal source and to avoid directing radiation at the object (which may be a human user). Accordingly by determining the proximity of one or more external objects to the device or by determining whether one or more objects are in close proximity to the antenna, the principal communication direction of the antenna can be adjusted accordingly and a better wireless communications link can be achieved between the antenna and the electromagnetic signal source.

It may be that the method comprises determining (or the controller is configured to determine) from proximity sensor data the relative direction of one or more (typically external) objects in close proximity to the antenna. For example, it may be that the proximity sensor comprises one or more directional electromagnetic signal sources (e.g. infrared LED) configured to transmit electromagnetic radiation in a given direction, and one or more (typically directional) photodetectors configured to detect reflected radiation from one or more objects in close proximity to the antenna. When an object is detected, it can be deduced that the direction of the said object relative to the antenna corresponds with the transmission direction of the electromagnetic signal source and the principal communication direction of the antenna can be adjusted accordingly.

It may be that one or more or each of the steering data portions is associated with one or more proximity sensor conditions. It may be that the method comprises determining (or the controller is configured to determine) whether the one or more proximity sensor conditions are met by processing the said proximity sensor data and selecting (or the controller is configured to select) a said steering data portion associated with the proximity sensor conditions responsive to a determination that the said proximity sensor conditions are met. For example, it may be that one or more or each of the said steering data portions is associated with a condition that an object is in close proximity to one of the said proximity sensors and the said steering data portions provide antenna configuration data suitable for directing radiation away from the object while providing a wireless communications link with the electromagnetic signal source.

Alternatively, it may be that the selected steering data portion is processed together with the proximity sensor data to determine the said adjusted principal communication direction of the steerable directional antenna. For example, it may be that the proximity sensor data is indicative that an object is in close proximity to the antenna (e.g. in a given direction), and the selected steering data portion comprises the location of a terrestrial electromagnetic signal source detectable by the antenna. In this case, the method may comprise determining (or the controller may be configured to determine) the adjusted principal communication direction of the steerable directional antenna taking into account the relative direction from the antenna of the terrestrial electromagnetic signal source and the presence of the object (and optionally, if provided, the direction of the object relative to the antenna).

It may be that the way in which the user is holding the device (or indeed whether the device is being held at all) can be determined from the sensor data provided by temperature and/or pressure sensors of a or the device comprising the antenna. The way in which the user is holding the device (e.g. positions of the user's fingers on the external surface of the housing of the device) may be indicative of an orientation of the device and/or a proximity of the user to the device, and therefore the preferred principal communication direction of the antenna.

It may be that the method comprises: selecting (or the controller is configured to select) the said steering data portion from the location specific steering data and/or determining (or the controller is configured to determine) the said adjusted principal communication direction of the steerable directional antenna taking into account sensor data from one or more pressure sensors and/or one or more temperature sensors.

Typically the said one or more pressure sensors and/or said one or more temperature sensors are pressure/temperature sensors of a or the device comprising the antenna.

It may be that the temperature and/or pressure sensors are provided on or in communication with an external surface of a housing of the antenna (e.g. an external surface of a housing of a or the device comprising the antenna).

It may be that the steerable antenna apparatus comprises said one or more pressure sensors and/or said one or more temperature sensors.

It may be that one or more or each of the steering data portions is associated with one or more temperature sensor conditions and/or pressure sensor conditions. It may be that the method comprises determining (or the controller is configured to determine) whether the one or more temperature sensor conditions and/or the one or more pressure sensor conditions are met by processing the said temperature and/or pressure sensor data and selecting (or the controller is configured to select) the said steering data portion responsive to a determination that the said sensor conditions associated with the said steering data portion are met. For example, it may be that one or more or each of the steering data portions is associated with a condition that one or more (e.g. selected) temperature sensors detect temperatures above a threshold and/or one or more (e.g. selected) pressure sensors detect pressures above a threshold (which indicate a particular orientation of the antenna) and the said steering data portions provide antenna configuration data suitable for directing radiation to (or receiving radiation from) the electromagnetic signal source when the antenna is at that orientation.

Alternatively, it may be that the controller is configured to process (or the method may comprise processing) the selected steering data portion together with the temperature and/or pressure sensor data to determine the said adjusted principal communication direction of the steerable directional antenna. For example, the temperature and/or pressure sensor data may be indicative that a user is handling the device comprising the antenna, which may be indicative of a (close) proximity of a user to the antenna (which may in turn indicate that the antenna radiation should be directed away from the user); alternatively, the temperature and/or pressure sensor data may be indicative that the device is in a user's pocket, which may be indicative of a (close) proximity of the user to the antenna (which may in turn indicate that the antenna radiation should be directed away from the user).

A or the device comprising the antenna may comprise one or more (typically two or more) usage modes. A usage mode of the device may be, for example, any of the following: voice call mode, video call mode, browsing internet mode, watching video mode, download mode, upload mode. It may be that the usage mode of the device is indicative of the orientation of the device which, as indicated above, affects the direction of the electromagnetic signal source relative to the antenna. Additionally or alternatively it may be that the usage mode of the device is indicative of a proximity of the user to the device. Accordingly, the usage mode of the device can be used to more accurately determine the adjusted principal communication direction of the antenna.

It may be that one or more or each of the steering data portions comprises steering data associated with one or more usage modes of the device.

It may be that the method further comprises: determining (or the controller is configured to determine) a usage mode of a or the device comprising the antenna; and selecting (or the controller is configured to select) the said steering data portion from the location specific steering data taking into account (e.g. associated with) the determined usage mode of the device.

It may be that the controller is configured to obtain or to receive an indication of the usage mode of the device (e.g. from an operating system of the device).

Additionally or alternatively, it may be that the method comprises providing (or the memory comprises) usage mode data indicative of one or more parameters specific to (and typically associated with) each of one or more usage modes. The said one or more parameters may comprise any one or more of: an orientation of the device associated with a usage mode; a proximity of a user to a or the device comprising the antenna, said proximity being associated with a usage mode; a location of the user relative to the antenna associated with a usage mode; an antenna steering configuration or direction associated with a usage mode; and a location of the said electromagnetic signal source, the electromagnetic signal source being associated with a usage mode.

It may be that the said electromagnetic signal source is a base station or access point with which the best quality wireless link can be obtained by the antenna when the device is being used at a particular location. Accordingly, it may be that one or more or each of the said parameters are location specific.

It may be that the method further comprises: determining (or the controller is configured to determine) a usage mode of a or the device comprising the antenna; and determining (or the controller is configured to determine) the adjusted principal communication direction of the steerable directional antenna taking into account the determined usage mode of the device.

It may be that the method comprises taking (or the controller is configured to take) the determined usage mode of the device into account by taking into account said one or more parameters associated with the said usage mode (and typically specific to the said user). For example, the method may comprise determining (or the controller is configured to determine) the adjusted principal communication direction of the steerable directional antenna taking into account an orientation of the device and/or a proximity of the user and/or an antenna steering configuration or direction associated with the usage mode.

Different users may have different ways of holding and/or orienting the device in each usage mode. Accordingly, it may be that the said steering data associated with one or more usage modes of the device is specific to a or the user of the device. For example, it may be that the said steering data portions associated with a usage mode are each derived from usage of the antenna by the user in the said usage mode. By providing steering data associated with one or more usage modes of the device which is specific to the user, the principal communication direction of the antenna can be more accurately adjusted for that user.

It may be that the said parameters (if provided) are also specific to a or the user of the device. Typically the said usage mode data is provided as part of the said user profile customised for the user of the device.

It may be that the controller is further configured to determine an activation status (e.g. on or off) of one or more peripheral features of a or the device comprising the antenna and/or whether one or more peripheral devices are coupled to the device (e.g. by way of one or more respective ports of the device) and/or whether one or more peripheral devices coupled to the device (e.g. by way of one or more respective ports of the device) are activated. It may be that the method comprises: selecting (or the controller is configured to select) the said steering data portion from the location specific steering data and/or determining (or the controller is configured to determine) the said adjusted principal communication direction of the steerable directional antenna taking into account an activation status (e.g. on or off) of one or more peripheral features of a or the device comprising the antenna and/or whether one or more peripheral devices are coupled to the device and/or whether one or more peripheral devices coupled to the device are activated. For example, whether a loudspeaker of the device is activated could be indicative of whether a speaker phone mode is activated, which may in turn be indicative of whether a user is in close proximity to the antenna. Similarly, whether headphones are coupled to the device may be indicative of whether a hands free function is being employed, which may in turn be indicative of whether a user is in close proximity to the device. In either case, the preferred adjusted principal communication direction of the antenna would be affected.

It may be that the method comprises: selecting (or the controller is configured to select) the said steering data portion from the location specific steering data and/or determining (or the controller is configured to determine) the said adjusted principal communication direction of the steerable directional antenna taking into account two or more of: an orientation of the antenna (e.g. pitch and/or yaw and/or roll of the antenna); an orientation of the device comprising the antenna; sensor data from one or more sensors (typically from one or more sensors of a or the device comprising the antenna); sensor data from one or more proximity sensors indicative of whether a user is in close proximity to the antenna; sensor data provided by temperature and/or pressure sensors of a or the device comprising the antenna; a usage mode of the device comprising the antenna; an activation status (e.g. on or off) of one or more peripheral features of a or the device comprising the antenna and/or whether one or more peripheral devices are coupled to the device (e.g. by way of one or more respective ports of the device) and/or whether one or more peripheral devices coupled to the device (e.g. by way of one or more respective ports of the device) are activated.

It may be that the steerable antenna apparatus comprises a location sensor (e.g. a GPS module or other, e.g. wireless or software based or hybrid location sensor) configured to determine the location of the antenna. For example a or the device comprising the antenna may comprise a location sensor configured to determine the location of the device comprising the antenna. It may be that the method comprises determining (or the controller is configured to determine) the location of the antenna using data (e.g. data identifying local base stations and/or their locations) received from baseband circuitry of a or the device comprising the antenna.

It may be that the method further comprises: detecting (or the controller is configured to detect) motion of the antenna; and selecting (or the controller is configured to select) a steering data portion from the location specific steering data taking into account the detected motion of the antenna.

It may be that the said motion comprises a change of orientation of the antenna. It may be that the said motion comprises a change of location of the antenna.

It may be that motion is detected by comparing successive estimates of the location of the antenna from the location sensor. Additionally or alternatively it may be that the steerable antenna apparatus comprises a movement sensor (e.g. accelerometer) configured to detect motion of the antenna.

It may be that the method comprises: predicting (or the controller is configured to predict) a future location of the antenna (e.g. from the said detected motion of the antenna); and selecting (or the controller is configured to select) a steering data portion specific to that future location.

It may be that the method further comprises determining (or the controller is configured to determine or receive) the direction of motion of the antenna (e.g. by comparing subsequent or successive estimates of the location of the device by the location sensor). It may be that the steerable antenna apparatus comprises a direction sensor (e.g. compass) configured to determine a direction of movement of the device.

It may be that the method further comprises: determining (or the controller is configured to determine) the orientation of the antenna; and taking (or the controller is configured to take) the orientation of the antenna into account to determine the direction of motion of the antenna (e.g. it may be that directional information output by a compass assumes a particular orientation of the device, and the orientation information allows more accurate directional information to be deduced).

The method typically comprises predicting (or the controller is configured to predict) the said future location of the device taking into account the said direction of movement of the device.

It may be that the method further comprises determining (or the controller is configured to determine) a speed (or velocity) of movement of the antenna from the said detected motion of the antenna. Typically the method comprises predicting (or the controller is configured to predict) the said future location of the antenna taking into account the said speed (or velocity) of movement of the antenna.

It may be that the method comprises adjusting (or the controller is configured to adjust) the principal communication direction of the antenna, e.g. periodically or responsive to detected motion of the antenna. It may be that the method comprises adjusting (or the controller is configured to adjust) the principal communication direction of the antenna more often responsive to a determined increase in speed of movement of the antenna.

It may be that the method further comprises: detecting (or the controller is configured to detect) motion of the antenna; and determining (or the controller is configured to determine) the adjusted principal communication direction of the steerable directional antenna taking into account the detected motion of the antenna.

It may be that the method comprises: predicting (or the controller is configured to predict) a future location of the antenna taking into account the said detected motion of the antenna; and determining (or the controller is configured to determine) the adjusted principal communication direction of the steerable directional antenna suitable for the said future location.

It may be that the principal communication direction of the steerable directional antenna is adjusted in accordance with the said adjusted principal communication direction (e.g. by the controller) responsive to a determination that the antenna has reached the predicted future location. Alternatively the step of adjusting the principal communication direction of the steerable directional antenna in accordance with the said adjusted principal communication direction is performed (e.g. by the controller) before (e.g. shortly before) the antenna has reached the predicted future location.

It may be that the method comprises: providing (or the memory comprises) movement pattern data indicative of one or more predetermined patterns of movement of the user (e.g. by providing movement pattern data indicative of one or more predetermined patterns of movement of the antenna); determining (or the controller is configured to determine) from the determined location of the antenna that the antenna is following a said predetermined pattern of movement; and predicting (or the controller is configured to predict) a future location of the antenna from the said pattern of movement, wherein the said selected steering data portion is specific to the said future location.

The patterns of movement of the antenna may comprise one or more routes which have been previously followed by a user of the antenna (e.g. by the antenna itself, or by a or the device comprising the antenna). It may be that the method comprises determining (or the controller is configured to determine) from the determined location of the antenna that the antenna is following a said pattern of movement on the basis that the determined location is (or two or more successive locations are) on a route previously followed by the antenna.

Typically by adjusting the principal communication direction of the antenna in accordance with the determined adjusted principal communication direction of the antenna, the antenna is brought into (typically radio frequency) wireless communication with the terrestrial electromagnetic signal source, or a wireless (typically radio frequency) communications link between the antenna and the terrestrial electromagnetic signal source is improved.

The antenna typically comprises two or more (e.g. an array of) antenna elements (such as the antenna described in WO2008/152428 which is incorporated in full herein by reference) which can be configured to directionally transmit and/or receive (typically radio frequency) electromagnetic communication signals by electronic beam forming. It may be that the antenna elements have positions and/or orientations which are fixed relative to each other. It may be that the antenna elements have positions and/or orientations which are fixed relative to a housing of a or the device comprising the antenna. The antenna elements of the antenna may comprise one or more transmitter antenna elements (e.g. operable to transmit radio communications signals such as 2G, 2.5G, 3G, 4G, 5G mobile telecommunications signals, Bluetooth signals, Wi-Fi signals or Wi-Max signals) and/or one or more receiver antenna elements (e.g. operable to receive radio communications signals such as 2G, 2.5G, 3G, 4G, 5G mobile telecommunications signals, Bluetooth signals, Wi-Fi signals or Wi-Max signals) and/or one or more transceiver antenna elements (e.g. operable to transmit and receive radio communications signals such as 2G, 2.5G, 3G, 4G, 5G mobile telecommunications signals, Bluetooth signals, Wi-Fi signals or Wi-Max signals). It may be that the antenna elements are implemented in semiconductor. It may be that the method comprises steering the antenna elements using one or more MEMS devices (or the antenna apparatus comprises one or more MEMS devices configured to steer the antenna elements). It may be that the principal communication direction of the antenna is selected electronically (e.g. by combining signals transmitted or detected by the antenna elements in particular ways). It may be that the step of adjusting the principal communication direction comprises steering the principal communication direction of the antenna electronically (e.g. by adjusting a principal beamforming direction of the antenna).

The antenna may comprise a sector antenna comprising two or more sectors which can be selectively activated and deactivated to transmit and/or receive (typically radio frequency) electromagnetic communication signals to or from selected communication directions, the antenna being steerable by activating and deactivating selected sectors of the antenna. It may be that the step of adjusting the principal communication direction is performed by activating and deactivating one or more respective sectors of the antenna.

The antenna may be mechanically rotatable so as to transmit and/or receive typically radio frequency) electromagnetic communication signals to or from selected communication directions, the antenna being steerable by mechanically rotating it from one configuration to another. It may be that the step of adjusting the principal communication direction comprises mechanically rotating the antenna.

It may be that the method comprises measuring (or the controller is configured to measure) a signal strength of one or more electromagnetic signals received by the antenna from the said electromagnetic signal source. It may be that the method comprises measuring (or the controller is configured to measure) a quality of the wireless link between the antenna and the electromagnetic signal source.

It may be that the steps of: selecting a steering data portion from the location specific steering data taking into account the determined location of the antenna (e.g. a steering data portion associated with the determined location); determining an adjusted principal communication direction of the steerable directional antenna taking into account the said selected steering data portion; and adjusting the principal communication direction of the steerable directional antenna in accordance with the said adjusted principal communication direction are performed periodically or responsive to a determination that a measured signal strength of one or more electromagnetic signals received by the antenna from the said electromagnetic signal source does not meet one or more signal strength criteria or responsive to a determination that a quality of the wireless link between the antenna and the electromagnetic signal source does not meet one or more link quality criteria.

It may be that the steps of determining an adjusted principal communication direction of the steerable directional antenna taking into account the said selected steering data portion; and adjusting the principal communication direction of the steerable directional antenna in accordance with the said adjusted principal communication direction are performed periodically or responsive to a determination that a measured signal strength of one or more electromagnetic signals received by the antenna from the said electromagnetic signal source does not meet one or more signal strength criteria or responsive to a determination that a quality of the wireless link between the antenna and the electromagnetic signal source does not meet one or more link quality criteria.

It may be that the principal communication direction of the antenna is adjusted iteratively taking into account a quality of a (typically radio frequency) wireless communications link between the antenna and the terrestrial electromagnetic signal source. For example, it may be that the method comprises: determining (or the controller is configured to determine) the (first) adjusted principal communication direction taking into account the selected steering data portion; adjusting (or the controller is configured to adjust) the principal communication direction in accordance with the adjusted principal communication direction; measuring (or the controller is configured to measure) a quality of a wireless communications link between the antenna and the terrestrial electromagnetic signal source (e.g. strength of signals received by the antenna from the electromagnetic signal source); determining (or the controller is configured to measure) a second adjusted principal communication direction taking into account the measured quality of the wireless communications link (e.g. responsive to the measured quality of the wireless communications link not meeting one or more link quality criteria at the (first) principal communication direction); and adjusting (or the controller is configured to adjust) the principal communication direction in accordance with the second adjusted principal communication direction to thereby improve the wireless communications link between the antenna and the electromagnetic signal source.

It may be that the method comprises providing (or the memory comprises) a target wireless communications link quality. It may be that the method comprises adjusting (or the controller is configured to adjust) the principal communication direction of the antenna iteratively until the said target wireless communications link quality is met. It may be that the method comprises adjusting (or the controller is configured to adjust) the principal communication direction of the antenna iteratively within a first adjustment range responsive to a determination that the measured wireless communications link quality is within a first target range of the target wireless communications link quality. It may be that the method comprises adjusting (or the controller is configured to adjust) the principal communication direction of the antenna iteratively within a second adjustment range greater than the first adjustment range responsive to a determination that the measured wireless communications link quality is within a second target range of the target wireless communications link quality greater than the first target range (and typically outside the first target range).

It may be that the method comprises determining (or the controller may be configured to determine) a frequency channel on which the antenna is communicating (or is trying to communicate) with the electromagnetic signal source. It may be that the method further comprises selecting (or the controller is configured to select) a said steering data portion from the location specific steering data and/or determining (or the controller is configured to determine) the said adjusted principal communication direction of the steerable directional antenna taking into account (or responsive to) the said frequency channel (e.g. to reduce or avoid interference or to increase the security of the link).

It may be that the controller is configured to obtain (or the method may comprise obtaining) assistance data from a general database comprising locations of one or more electromagnetic signal sources (e.g. base station locations and/or WiFi access point locations and/or WiFi network locations). It may be that the method comprises obtaining (or the controller is configured to obtain) the location of a second electromagnetic signal source from the general database; determining (or the controller is configured to determine) a second adjusted principal communication direction taking into account the location of the second electromagnetic signal source; and adjusting (or the controller is configured to adjust) the principal communication direction of the steerable directional antenna in accordance with the said second adjusted principal communication direction. It may be that these steps are performed for example when the said antenna changes location (e.g. to a location not previously occupied by the antenna) such that the said electromagnetic signal source is out of range of the antenna, and the antenna is required to communicate with a different (i.e. the second) electromagnetic signal source.

It may be that the method further comprises: providing (or the memory comprising) location specific power level data comprising one or more power level data portions, each of the power level data portions being specific to each of one or more locations (e.g. the said one or more locations with which the steering data portions are associated), the said power level data portions being indicative of respective power level configurations of one or more antenna amplifiers configured to adjust a power level of (e.g. amplify) signals to be transmitted and/or received by the antenna (e.g. which enable the antenna to communicate with the terrestrial electromagnetic signal source from the said locations); selecting (or the controller being configured to select) a power level data portion from the said power level data taking into account the determined location of the device; determining (or the controller being configured to determine) a power level configuration of the antenna amplifier(s) taking into account the selected power level data portion; and configuring (or the controller being configured to configure) the antenna amplifier(s) in accordance with the said determined power level configuration.

It may be that the said one or more antenna amplifiers comprises one or more power amplifiers configured to amplify signals to be transmitted by the antenna. It may be that the said one or more antenna amplifiers comprise one or more low noise amplifiers configured to amplify signals received by the antenna.

It may be that the steerable antenna apparatus comprises one or more antenna amplifiers configured to adjust a power level of (e.g. amplify) signals to be transmitted and/or received by the antenna and that the controller is configured to set a gain of (e.g. each of) the antenna amplifier(s) in accordance with the said determined power level configuration.

It may be that the antenna amplifiers have respective gains which are greater than unity, less than unity or unity (e.g. in the said determined power level configuration). Accordingly, it may be that the one or more antenna amplifiers comprise one or more signal boosters and/or one or more signal attenuators (e.g. in the said determined power level configuration). It may be that the one or more antenna amplifiers comprise a plurality of antenna amplifiers. It may be that amplifiers of the said plurality of antenna amplifiers have respective gains which are different from each other (e.g. in the determined power level configuration). It may be that one or more (or each) of the antenna amplifiers comprises amplifier circuitry, and that the amplifier gain is set by setting the gain of the amplifier circuitry. It may be that the amplifier circuitry of said one or more (or each) of the antenna amplifiers comprises signal boosting circuitry and/or signal attenuating circuitry. It may be that one or more of the antenna amplifier(s) comprises one or more (typically two or more, typically individually selectable) beamforming weightings applied to respective phase shifted signals combined in a beamforming algorithm. In this case, it may be that the controller is configured to set the antenna gain by adjusting the said beamforming weightings.

It will be understood that the steps of selecting the power level data portion and/or determining the power level configuration of the antenna amplifier(s) may also comprise taking into account sensor data received from one or more sensors. For example, sensor data from a proximity sensor may indicate the proximity of a user to the antenna. As a result, it may be that the determined adjusted principal communication direction does not point directly at the terrestrial electromagnetic signal source. Accordingly, it may be necessary to increase the power level to compensate. The power level may then be iteratively adjusted to meet a or the target quality of wireless communications link between the antenna and the said terrestrial electromagnetic signal source.

It may be that the said power level data is derived from usage of the antenna by a or the user of the antenna. Typically the said power level data is provided as part of the said user profile customised for the user of the antenna.

It may be that the method comprises configuring (or the controller may be configured to configure) the antenna amplifier(s) in accordance with the said determined power level configuration by adjusting an amplification provided by an amplifier to signals which are passed to the antenna for transmission. For example, the method may comprise adjusting the amplification provided by a power amplifier to signals which are to be transmitted by the antenna.

It may be that the method comprises configuring (or the controller may be configured to configure) the antenna amplifier(s) in accordance with the said determined power level configuration by adjusting an amplification provided by an amplifier to signals which are received by the antenna. For example, the method may comprise adjusting the amplification provided by a low noise amplifier to signals which are received by the antenna.

It will be understood that the steps of selecting the power level data portion and/or determining the power level configuration of the antenna may also comprise taking into account a usage mode of a or the device comprising the antenna. For example, a usage mode may involve having to communicate with the said electromagnetic signal source over a greater range than in other usage modes or a usage mode may require a higher quality link to provide a higher bit-rate (e.g. if large portions of data are to be downloaded). In such cases it may be that the step of selecting the power level data portion and/or determining the power level configuration of the antenna amplifier(s) comprises increasing the gain of the antenna amplifier in order to provide the higher quality bit-rate or the greater range.

It may be that the method further comprises: selecting (or the controller being configured to select) the said steering data portion taking into account a type of (typically wireless, typically radio frequency) communication performed by the antenna and/or by the terrestrial electromagnetic signal source.

It may be that selecting the said steering data portions take into account a communications protocol the antenna and/or the terrestrial electromagnetic signal source are configured to employ. For example, it may be that different steering data portions are provided for different communications protocols (e.g. Bluetooth, Wifi, 2G, GPRS, 3G, 4G, 5G) which can be performed by a or the device comprising the antenna (and optionally one or more other antenna), and the method comprises selecting (or the controller is configured to select) the said steering data portion taking into account the type of communications (e.g. the communications protocol) employed by the antenna and/or by the terrestrial electromagnetic signal source.

Typically, the antenna is provided on a (typically electronic) wireless communications device, such as a handheld or wearable wireless communications device (e.g. smart watch), wearable sensor, mobile wireless communications device, portable wireless communications device, mobile phone, mobile smartphone, phablet, tablet, laptop or netbook computer. The wireless communications device may alternatively comprise a picocell, femtocell, base station, signal node, beacon, router or repeater.

Typically the antenna is an antenna of an RF front end of a mobile wireless communications device.

It may be that the method further comprises communicating (or the controller is configured to bring the antenna into communication) with the terrestrial electromagnetic signal source in the said adjusted principal communication direction.

It may be that the method is performed on a or the device comprising the antenna. It may be that the method is performed partly on the device comprising the antenna and partly on one or more server computers with which the device comprising the antenna can communicate.

It may be that the memory is provided on the device comprising the antenna. It may be that the memory is provided on one or more server computers with which the device can communicate. It may be that the memory is distributed across the device and one or more server computers with which the device can communicate.

It may be that the controller is provided on the device comprising the antenna. It may be that the controller is provided on one or more server computers with which the device can communicate. It may be that the controller is distributed across the device and one or more server computers with which the device can communicate.

It may be that the method comprises determining (or the controller may be configured to determine) a frequency channel on which the antenna is communicating (or is trying to communicate) with the electromagnetic signal source. It may be that the method comprises adjusting (or the controller may be configured to adjust) a frequency response of one or more antenna amplifiers configured to adjust a power level of (e.g. amplify) signals to be transmitted and/or received by the antenna taking into account (or responsive to) the said frequency channel, typically to improve the performance of the amplifier(s) at one or more frequencies of the said frequency channel. This step is particularly important when the frequency channel is at the periphery of a frequency range comprising all available frequency channels for a particular wireless communications type, typically because it may be that by default the frequency response of the amplifier is tuned for peak performance at the centre of the said frequency range. Accordingly, by adjusting the frequency response of the amplifier(s) taking into account the said frequency channel, the quality of the communications link between the antenna and the electromagnetic signal source is improved.

It may be that the method comprises adjusting (or the controller may be configured to adjusting) the frequency response of one or more antenna amplifiers configured to adjust a power level of (e.g. amplify) signals which are to be transmitted by the antenna taking into account (or responsive to) the said frequency channel, typically to improve the performance of the amplifier(s) at one or more frequencies of the said frequency channel. For example, the method may comprise adjusting the frequency response of a power amplifier from which signals are passed to the antenna for transmission taking into account (or responsive to) the said frequency channel, typically to improve the performance of the amplifier at one or more frequencies of the said frequency channel.

It may be that the method comprises adjusting (or the controller may be configured to adjusting) the frequency response of one or more antenna amplifiers configured to adjust a power level of (e.g. amplify) signals received by the antenna taking into account (or responsive to) the said frequency channel, typically to improve the performance of the amplifier at one or more frequencies of the said frequency channel. For example, the method may comprise adjusting the frequency response of a low noise amplifier configured to amplify signals received by the antenna taking into account (or responsive to) the said frequency channel, typically to improve the performance of the amplifier at one or more frequencies of the said frequency channel.

It may be that the method comprises adjusting (or the controller may be configured to adjusting) the frequency response of a tunable filter configured to band pass filter signals which are to be transmitted by the antenna or signals which are received by the said antenna, taking into account the said frequency channel.

It may be that one or more or each said steering data portion is associated with an expected link quality of a wireless communications link between the antenna and the electromagnetic signal source. It may be that the method comprises comparing (or the controller is configured to compare) a current link quality of a wireless link between the said antenna and the electromagnetic signal source with the said expected link quality and selecting the said steering data portion responsive to a determination that the expected link quality is greater than the said current link quality.

Typically, when the antenna is a transmitter antenna or a transceiver antenna in transmitter mode, the principal communication direction is the centre of the radiation pattern/beam emitted by the antenna.

Typically, when the antenna is a receiver antenna or a transceiver antenna in receiver mode, the principal communication direction is the centre of the field of view of the antenna.

A third aspect of the invention provides a method of generating location specific steering data for a steerable directional antenna, the location specific steering data comprising one or more (typically two or more) steering data portions, each of the steering data portions being specific to a respective (typically absolute) location, the method comprising: providing the said steerable directional antenna at a location; adjusting a principal communication direction of the antenna to thereby provide a (typically radio frequency) wireless communications link between the antenna and a terrestrial electromagnetic signal source meeting one or more link criteria; and storing the said location together with a steering data portion related to, or derived from, the said adjusted principal communication direction.

A fourth aspect of the invention provides steerable directional antenna apparatus comprising: a steerable directional antenna; a memory; and a controller comprising one or more computer processors, the controller being configured to: determine a (typically absolute) location of the antenna; adjust a principal communication direction of the antenna to thereby provide a (typically radio frequency) wireless communications link between the antenna and a terrestrial electromagnetic signal source meeting one or more link criteria; and store in the memory the said location together with a steering data portion related to, or derived from, the said adjusted principal communication direction.

It will be understood that the controller of the fourth aspect of the invention may be configured to perform any of the steps of the method according to the third aspect of the invention.

It may be that the step of adjusting (or the controller may be configured to adjust) the principal communication direction of the antenna to thereby provide a wireless communications link between the antenna and a terrestrial electromagnetic signal source meeting one or more link criteria takes into account a location of the terrestrial electromagnetic signal source obtained from a general database (which is typically in communication with the controller).

It may be that the method comprises determining (or the controller is configured to determine, e.g. receive) the said location of the steerable directional antenna. It may be that the method comprises receiving (or the controller is configured to receive) the said location of the antenna, for example from a location sensor (e.g. of a device comprising the antenna) configured to determine the location of the antenna (e.g. by determining the location of a device comprising the antenna).

The method may further comprise storing (or the controller may be configured to store) an identifier of the electromagnetic signal source together with the said location and steering data.

It may be that the said steering data portion comprises any one or more of: an estimated location of the said terrestrial electromagnetic signal source (which may be specified in signals transmitted by the terrestrial electromagnetic signal source or deduced by triangulation, for example); antenna configuration data representing the said adjusted principal communication direction of the antenna; and data representing the adjusted principal communication direction (e.g. from which said configuration data can be derived).

It may be that the method comprises generating movement pattern data indicative of one or more patterns of movement of the user, for example by: determining a plurality of locations of the user (e.g. by determining a plurality of locations of the antenna or of the device); identifying one or more patterns of movement of the antenna from the said plurality of locations (e.g. one or more paths or routes followed once, or more than once by the user carrying the antenna); and generating movement pattern data indicative of the said identified patterns of movement.

The patterns of movement of the user may comprise one or more routes followed by the user (e.g. when carrying the antenna).

It may be that the method further comprises: determining (or the controller is configured to determine) an orientation of the antenna (e.g. by determining orientation of a device comprising antenna), typically when the wireless communications link meets the said link criteria; and storing (or the controller is configured to store in the memory) data representing the said orientation of the antenna together with said steering data portion and location.

The steerable antenna apparatus may comprise one or more orientation sensors configured to measure (or the method may comprise measuring) the orientation of the antenna. For example, the steerable antenna apparatus may comprise any one or more of the following configured to measure the orientation of the antenna: an accelerometer; a gyroscope; a magnetometer; a compass. Alternatively, the antenna apparatus may be configured to measure (or the method may comprise measuring) the orientation of the antenna by adjusting the principal communication direction of the antenna. For example, if the location of the electromagnetic signal source is known, the method may comprise (e.g. iteratively) adjusting (or the controller may be configured to (e.g. iteratively) adjust) the principal communication direction of the antenna a plurality of times; measuring signal strengths of one or more electromagnetic signals received from the electromagnetic signal source or measuring link qualities of the wireless link between the antenna and the electromagnetic signal source at each of the principal communication directions; and determining the orientation of the antenna taking into account the known location of the electromagnetic signal source and the measured received signal strengths or link qualities.

It may be that the method further comprises: determining (or the controller is configured to determine) sensor data from one or more sensors, typically when the wireless communications link meets the said link criteria; and storing the said sensor data together with said steering data portion and location.

The sensors may comprise any one or more of the following: orientation sensor configured to determine the orientation of the antenna; proximity sensor configured to determine proximity of one or more external objects to the antenna; temperature sensor configured to determine a temperature of an external surface of a housing of a device comprising the antenna; a pressure sensor configured to determine a physical pressure exerted on an external surface of a housing of a device comprising the antenna; and a usage mode sensor configured to determine a usage mode of the device comprising the antenna.

It may be that the method further comprises: determining an activation status (e.g. on or off) of one or more peripheral features of a or the device comprising the antenna and/or whether one or more peripheral devices are coupled to the device and/or whether one or more peripheral devices coupled to the device are activated, typically when the wireless communications link meets the said link criteria; and storing (or the controller is configured to store) data representing the said activation status (e.g. on or off) of one or more peripheral features of a or the device comprising the antenna and/or whether one or more peripheral devices are coupled to the device and/or whether one or more peripheral devices coupled to the device are activated together with the steering data and location.

It may be that the method further comprises: determining (or the controller is configured to determine) a usage mode of a device comprising the antenna, typically when the wireless communications link meets the said link criteria; and storing (or the controller is configured to store in the memory) usage mode data representing the said usage mode together with said steering data portion and location.

It may be that the method further comprises: determining (or the controller is configured to determine) a frequency channel of the wireless communications link, typically when the wireless communications link meets the said link criteria; and storing (or the controller is configured to store in the memory) frequency channel data together with said steering data portion and location.

It may be that the method further comprises: determining (or the controller is configured to determine) a communications type of the wireless communications link, typically when the wireless communications link meets the said link criteria; and storing (or the controller is configured to store in the memory) communications type data representing the said communications type of the wireless communications link together with said steering data portion and location.

It may be that the method further comprises: determining (or the controller is configured to determine) a quality of the said wireless communications link, typically when the wireless communications link meets the said link criteria; and storing (or the controller is configured to store in the memory) link quality data indicative of the quality of the said wireless communications link together with said steering data portion and location.

It may be that the method further comprises: determining (or the controller is configured to determine) power level data indicative of respective power level configurations of one or more antenna amplifiers configured to adjust a power level of (e.g. amplify) signals to be transmitted and/or received by the antenna when the wireless communications link meets the said link criteria; and storing (or the controller is configured to store in the memory) data representing the said power level data together with said steering data portion and location.

It may be that the said link criteria comprise a determination that a wireless communications link has been established between the antenna and the terrestrial electromagnetic signal source (e.g. when previously there was no such link).

It may be that the said link criteria comprise a determination that a wireless communications link has been established between the antenna and the terrestrial electromagnetic signal source having a bit rate exceeding a predetermined threshold.

It may be that the said link criteria comprise a determination that a wireless communications link has been established between the antenna and the terrestrial electromagnetic signal source having a bit error rate below a predetermined threshold.

It may be that the said link criteria comprise a determination that a wireless communications link has been established between the antenna and the terrestrial electromagnetic signal source having a signal to noise ratio above a predetermined threshold.

It may be that the said link criteria comprise a determination that a wireless communications link has been established between the antenna and the terrestrial electromagnetic signal source having a received signal strength greater than a predetermined threshold.

It may be that the step of adjusting the principal communication direction of the antenna comprises adjusting (or the controller is configured to adjust) the principal communication direction of the antenna a plurality of times to provide a plurality of adjusted principal communication directions and selecting (or the controller is configured to select) the principal communications direction of the said plurality of principal communication directions which provides the highest quality wireless communications link between the antenna and the terrestrial electromagnetic signal source. It may be that the said plurality of adjusted principal communication directions comprises each possible principal communication direction of the antenna.

It may be that the principal communication direction of the antenna is adjustable across a first range. It may be that the step of adjusting the principal communication direction of the antenna comprises adjusting (or the controller is configured to adjust) the principal communication direction of the antenna across a second range, the second range being a subset of the first range, responsive to a determination that a battery level (i.e. the electrical power available from a battery) of a or the device comprising the antenna is below a predetermined threshold.

It may be that the controller is a controller of a or the device comprising the antenna, or it may be that the controller is a controller of one or more server computers in communication with a or the device comprising the antenna, but more typically the controller is distributed across a or the device comprising the antenna and one or more server computers. It may be that the controller is implemented in hardware or in computer software, but more typically the controller is implemented in a combination of hardware and software.

It may be that the said memory is a memory of a or the device comprising the antenna, but more typically the said memory is a memory of one or more server computers.

Alternatively, the memory is distributed across a or the device comprising the antenna and one or more server computers.

It may be that the method comprises storing (or the controller is configured to store) the said steering data portion and the said location on a memory of one or more server computers (or the said memory is a memory of one or more server computers). It may be that the step of storing the said steering data portion and the said location is performed (or the controller is configured to store the said steering data portion in the memory) as part of a batch update comprising storing a plurality of steering data portions together with a respective plurality of locations. It may be that the step of storing the said steering data portion and the said location comprises: determining (or the controller is configured to determine) a battery level of a or the device comprising the antenna; and uploading (or the controller is configured to upload) the said steering data portion and data representing the said location to the said memory of the server computer(s) responsive to a determination that the battery level is greater than a predetermined threshold. It may be that the method comprises determining (or the controller is configured to determine) a battery level of a or the device comprising the antenna; and not uploading (or the controller is configured to not upload) the said steering data portion and data representing the said location to the said memory of the server computer(s) responsive to a determination that the battery level is less than a predetermined threshold.

It may be that the step of adjusting the principal communication direction of the antenna comprises (or the controller is configured to adjust the principal communication direction of the antenna by) mechanically rotating a rotatable antenna (typically at the said location).

It may be that the step of adjusting the principal communication direction of the antenna comprises (or the controller is configured to adjust the principal communication direction of the antenna by) activating and/or deactivating one or more sectors of a sector antenna (typically at the said location).

It may be that the antenna comprises a plurality of antenna elements (such as the antenna described in WO2008/152428 which is incorporated in full herein by reference). It may be that detected signals from each of the antenna elements are passed through respective phase shifters to provide a respective plurality of phase shifted signals. It may be that the phase shifted signals are then combined to form the directional signal transmitted or received by the antenna.

It may be that the step of adjusting the principal communication direction of the antenna comprises (or the controller is configured to adjust the principal communication direction of the antenna by) steering the principal communication direction of the antenna electronically (e.g. by adjusting a principal beamforming direction of the antenna). For example, it may be that the step of adjusting the principal communication direction of the antenna comprises (or the controller is configured to adjust the principal communication direction of the antenna by) adjusting beamforming parameters (e.g. coefficients, weightings, phase shifts) associated with antenna elements of the antenna array.

It may be that the locations to which the respective steering data portions are specific are points or loci of points in space. The said points or loci may be represented, for example, by (two-dimensional or three-dimensional) location co-ordinates (e.g. longitude, latitude and, for three dimensional co-ordinates, altitude) or one or more ranges of (two-dimensional or three-dimensional) location co-ordinates.

Typically the method comprises storing (or the controller is configured to store) the said location together with steering data related to, or derived from, the said adjusted principal communication direction (optionally together with any of the other data storage discussed above) to thereby generate location specific steering data for a steerable directional antenna which is specific to a user (e.g. a user of a or the device comprising the antenna).

It may be that the method comprises storing (or the controller is configured to store) the said location together with a steering data portion related to, or derived from, the said adjusted principal communication direction (optionally together with any of the other data storage discussed above) to thereby generate location specific steering data for a steerable directional antenna which is customised for a user (e.g. a user of a or the device comprising the antenna).

It may be that the method comprises storing (or the controller is configured to store) the said location together with a steering data portion related to, or derived from, the said adjusted principal communication direction (optionally together with any of the other data storage discussed above) to thereby customise a user profile associated with a user (e.g. of a or the device comprising the antenna).

A fifth aspect of the invention provides a non-transitory computer readable medium tangibly embodying computer program code for causing a computer to adjust a principal communication direction of a steerable directional antenna for communicating with a terrestrial electromagnetic signal source by: receiving location specific steering data comprising one or more steering data portions, each of the steering data portions being specific to a respective location; receiving a location of the steerable directional antenna; selecting a steering data portion from the location specific steering data taking into account the received location of the antenna; determining an adjusted principal communication direction of the steerable directional antenna taking into account the said selected steering data portion; and adjusting the principal communication direction of the steerable directional antenna in accordance with the said adjusted principal communication direction.

A sixth aspect of the invention provides a non-transitory computer readable medium tangibly embodying computer program code for causing a computer to generate location specific steering data for a steerable directional antenna, the location specific steering data comprising one or more (typically two or more) steering data portions, each of the steering data portions being specific to a respective (typically absolute) location, by: receiving a location of the antenna; adjusting a principal communication direction of the antenna to thereby provide a (typically radio frequency) wireless communications link between the antenna and a terrestrial electromagnetic signal source meeting one or more link criteria; and storing the said location together with a steering data portion related to, or derived from, the said adjusted principal communication direction.

A seventh aspect of the invention provides a method of controlling the power level of signals to be transmitted and/or received by an antenna (typically a steerable directional antenna), the method comprising: providing location specific power level data comprising one or more power level data portions, each of the power level data portions being specific to each of one or more locations, the said power level data portions being indicative of respective power level configurations of one or more antenna amplifiers configured to adjust a power level of (e.g. amplify) signals to be transmitted and/or received by the antenna; determining a location of the antenna; selecting a power level data portion from the said power level data taking into account the determined location of the antenna; determining a power level configuration of the antenna amplifier(s) taking into account the selected power level data portion; and configuring the antenna amplifier(s) in accordance with the said determined power level configuration.

An eighth aspect of the invention provides antenna apparatus comprising: an antenna (typically a steerable directional antenna) for communicating with a terrestrial electromagnetic signal source; a memory comprising location specific power level data comprising one or more power level data portions, each of the power level data portions being specific to each of one or more locations, the said power level data portions being indicative of respective power level configurations of one or more antenna amplifiers configured to adjust a power level of (e.g. amplify) signals to be transmitted and/or received by the antenna; and a controller configured to: determine (e.g. receive) a location of the antenna; select a power level data portion from the said power level data taking into account the determined location of the antenna; determine a power level configuration of the antenna amplifier(s) taking into account the selected power level data portion; and configure the antenna amplifier(s) in accordance with the said determined power level configuration.

A ninth aspect of the invention provides a non-transitory computer readable medium tangibly embodying computer program code for causing a computer to control the power level of signals to be transmitted and/or received by an antenna (typically a steerable directional antenna) by: receiving location specific power level data comprising one or more power level data portions, each of the power level data portions being specific to a respective location; receiving a location of the antenna; selecting a power level data portion from the location specific power level data taking into account the received location of the antenna; determining a power level configuration of the antenna amplifier(s) taking into account the said selected power level data portion; and configuring the antenna amplifier(s) in accordance with the said determined power level configuration.

A tenth aspect of the invention provides a method of generating location specific power level data for one or more antenna amplifiers configured to adjust a power level of (e.g. amplify) signals to be transmitted and/or received by an antenna (typically a directional, steerable antenna), the location specific power level data comprising one or more (typically two or more) power level data portions, each of the power level data portions being specific to a respective (typically absolute) location, the method comprising: providing the said antenna at a location; adjusting the signal gains and/or the signal amplitudes provided by the said one or more antenna amplifiers to thereby provide a wireless communications link between the antenna and a terrestrial electromagnetic signal source meeting one or more link criteria; and storing the said location together with a power level data portion related to or derived from the said adjusted signal gains and/or signal amplitudes.

An eleventh aspect of the invention provides antenna apparatus comprising: an antenna (typically a directional, steerable antenna); a memory; and a controller comprising one or more computer processors, the controller being configured to: determine a (typically absolute) location of the antenna; adjust signal gains and/or signal amplitudes provided by one or more antenna amplifiers configured to adjust a power level of (e.g. amplify) signals to be transmitted and/or received by the antenna to thereby provide a wireless communications link between the antenna and a terrestrial electromagnetic signal source meeting one or more link criteria; and store in the memory the said location together with a power level data portion related to or derived from the said adjusted signal gains and/or signal amplitudes.

The preferred and optional features of each aspect of the invention disclosed herein are preferred and optional features of each other aspect of the invention to which they are applicable. For the avoidance of doubt, the preferred and optional features of each aspect of the invention are also preferred and optional features of all of the other aspects of the invention, where applicable.

For the avoidance of doubt, in respect of the seventh to eleventh aspects of the invention, it may be that the antenna amplifiers have respective gains which are greater than unity, less than unity or unity. Accordingly, it may be that the one or more antenna amplifiers comprise one or more signal boosters and/or one or more signal attenuators. It may be that the one or more antenna amplifiers comprise a plurality of antenna amplifiers. It may be that respective amplifiers of the said plurality of antenna amplifiers have gains which are different from each other (e.g. in the determined power level configuration).

DESCRIPTION OF THE DRAWINGS

An example embodiment of the present invention will now be illustrated with reference to the following Figures in which:

FIG. 5 is an illustration of a memory comprising a plurality of steering data portions, each of which is associated with a respective location;

FIGS. 6 and 7 are schematic diagrams similar to FIGS. 2 and 3 respectively, but with the principal communication direction of the directional antenna adjusted to point towards the terrestrial electromagnetic signal source;

DETAILED DESCRIPTION OF AN EXAMPLE EMBODIMENT

Figure 1:
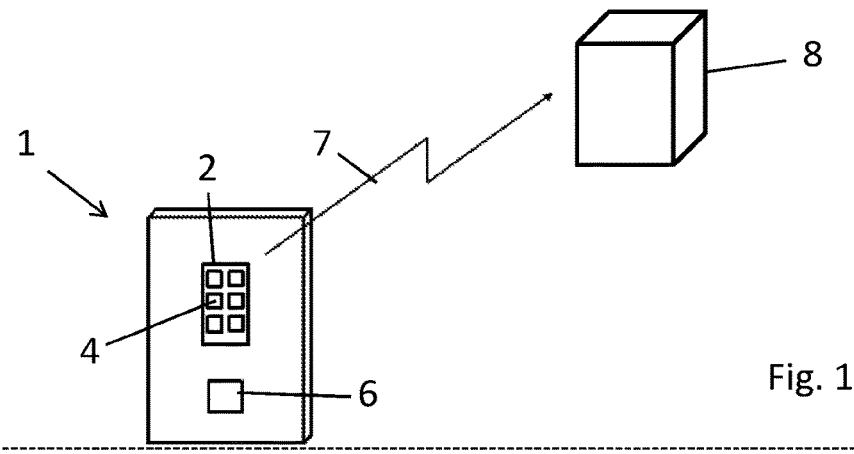
FIG. 1 is a schematic diagram of a mobile wireless communication device having a directional antenna pointing towards a terrestrial electromagnetic signal source.

FIG. 1 is a schematic diagram of a human portable wireless communications device 1 (such as a smartphone, tablet, laptop or wearable computer) having a steerable directional antenna 2 comprising an array of antenna elements 4 in communication with a controller 6 comprising a computer processor. The positions of the antenna elements are fixed relative to a housing of the device 1. The antenna 2 is electronically steered by beamforming such that its principal communication direction 7 is aligned with a terrestrial radio frequency electromagnetic signal source 8 (such as a base station of a cellular communications network, a Wi-fi router or a Bluetooth beacon) with which the antenna 2 communicates (i.e. the antenna 2 transmits signals to and/or receives signals from the terrestrial electromagnetic signal source 8). For typical directional antennas of this type, the majority of electromagnetic signal power is transmitted within 60° of the principal communication direction, and more preferably within 10° of the principal communication direction.

Figure 2:
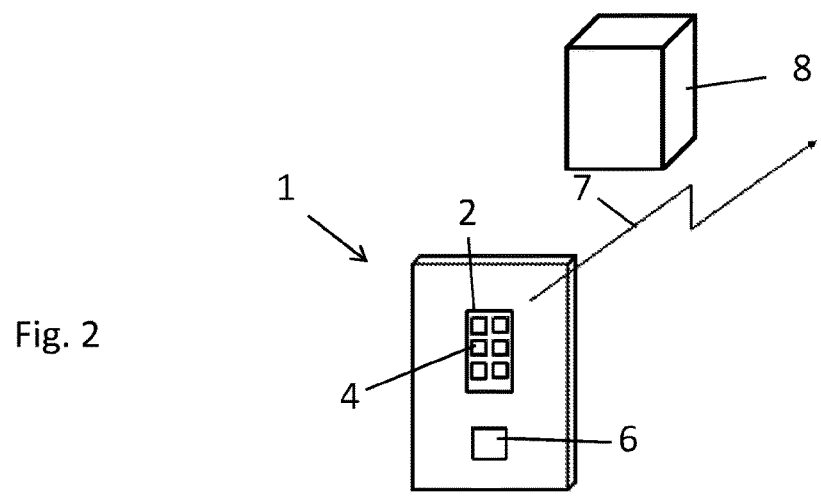
FIG. 2 is a similar schematic diagram to FIG. 1, but with the device having changed location as compared to the view of FIG. 1 such that the directional antenna points away from the terrestrial electromagnetic signal source.

FIG. 2 is a schematic diagram of the wireless communications device 1 having changed location from that illustrated in FIG. 1, the wireless communications device 1 being closer to the (fixed location) electromagnetic signal source 8 in FIG. 2 than in FIG. 1. The antenna 2 of the wireless communications device 1 is configured to have the same principal communication direction as in FIG. 1. Accordingly, as the device 1 has changed location, the principal communication direction 7 of the antenna 2 no longer aligns with the electromagnetic signal source 8. This reduces the quality of the wireless communications link between the antenna 2 and the signal source 8 (or even causes the said wireless communications link to be dropped).

Figure 3:
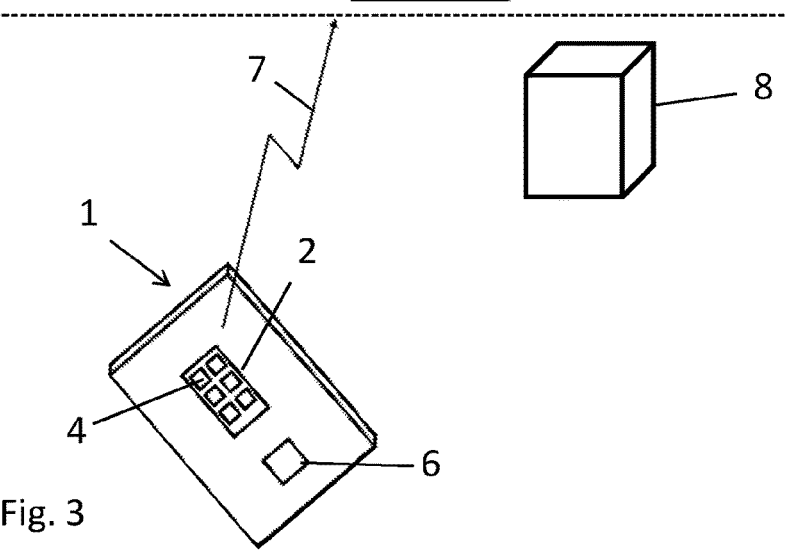
FIG. 3 is a similar schematic diagram to FIG. 1, but with the device rotated as compared to the view of FIG. 1 such that the directional antenna points away from the terrestrial electromagnetic signal source.

Similarly, FIG. 3 is a schematic diagram of the wireless communications device 1 having been rotated from the position illustrated in FIG. 1, but with the antenna being configured to have the same principal communication direction as in FIG. 1. Again the principal communication direction of the antenna 2 no longer aligns with the electromagnetic signal source 8. This reduces the quality of the wireless communications link between the antenna 2 and the signal source 8 (or even causes the said wireless communications link to be dropped).

Figure 4:
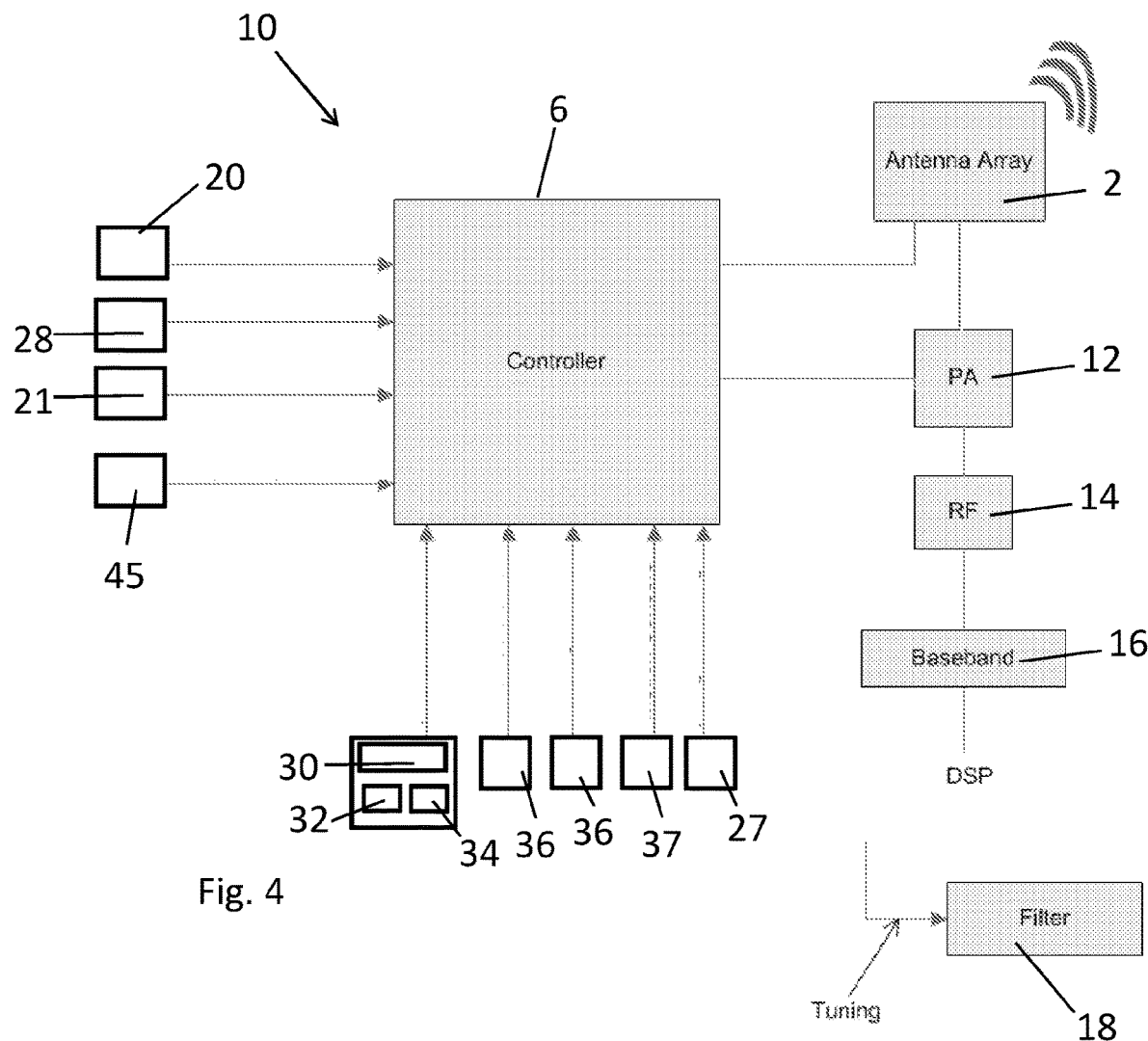
FIG. 4 is a block diagram illustrating a controller of the device of FIGS. 1 to 3 configured to adjust the principal communication direction of the antenna to point at the terrestrial electromagnetic signal source responsive to location.

FIG. 4 illustrates transmitter circuitry of an RF front end 10 of the wireless communications device 1, the transmitter circuitry comprising: the controller 6 in communication with the antenna 2; a (typically analogue) power amplifier 12 which provides amplified, modulated signals to the antenna 2 (for transmission to the electromagnetic signal source 8) by amplifying modulated signals received from an (typically analogue) RF modulator 14. The RF modulator 14 modulates a baseband signal provided by (typically digital) baseband circuitry 16 (which signal is typically converted into an analogue signal by a digital to analogue converter (DAC), not shown, before it reaches the RF modulator) using a modulating signal from a local oscillator (not shown). Further intermediate signal conditioning is typically provided, for example band-pass filtering of the signal modulated by the RF modulator by a tunable filter 18 for a specific frequency or dedicated channel to provide optimum/desired performance.

The RF front end 10 further comprises receiver circuitry configured to process signals received by the antenna 2 (e.g. in a receiver mode), but this is not shown in FIG. 4. For completeness, the RF receiver circuitry typically comprises a (typically analogue) low noise amplifier configured to receive and amplify detected signals from the antenna 2 and to provide the amplified signals to a (typically analogue) demodulator (e.g. mixer) which receives the amplified signals as a first input and a demodulating signal from a local oscillator as a second input. The demodulated signal is then typically passed through an analogue to digital converter to the baseband circuitry 16. Further intermediate signal conditioning circuitry is typically provided.

As illustrated above with respect to FIG. 2, a change of location of the device 1 affects the spatial alignment between the principal communication direction of the antenna 2 and the electromagnetic signal source 8, which can reduce the quality of the wireless communications link between the antenna 2 and the electromagnetic signal source 8. Accordingly, in order to maintain a wireless communications link (and preferably a wireless communications link meeting one or more link quality criteria) between the antenna 2 and the electromagnetic signal source 8, the controller 6 is configured to adjust the principal communication direction of the antenna 2 taking into account the location of the device 1. The controller 6 may be configured to adjust the principal communication direction of the antenna 2 periodically, or responsive to a determination that the strength of signals received from the electromagnetic signal source 8 or the link quality of the wireless communications link between the antenna 2 and the electromagnetic signal source 8 do not meet one or more link criteria (e.g. particular bit rates, bit error rates, signal to noise ratios). Measures of the link quality and signal strength are obtained from baseband circuitry 27 (which is typically part of the baseband module 16) but may alternatively (and preferably) be obtained by processing signals received (more directly) from the analogue receiver circuitry of the RF front end (by way of an analogue to digital converter), for example by measuring signal to noise ratio of the received signals by comparing the received signals to a replica signal.

The controller 6 receives an estimate of the location of the wireless communications device 1 (and therefore an estimate of the location of the antenna 2) from a location sensor 20 (e.g. GPS location sensor, or any other suitable location sensor such as a location sensor which uses the known positions of detectable electromagnetic signal sources together with signals received from those signal sources to estimate the position of the device, for example by triangulation) of the wireless communications device 1. In addition, the controller 6 is configured to request and receive a user profile 21 which is customised for a user of the device 1, and is at least in part derived from usage of the device 1 by a user (e.g. a user registered to the device). The user profile 21 may be provided on a memory of the device 1, but more typically the user profile 21 is received by the controller 6 from a memory of one or more server computers in data communication with the device 1.

As illustrated in FIG. 5, the user profile 21 comprises location specific steering data comprising a plurality of steering data portions 24, each of which is specific to a respective absolute location 26. Each of the steering data portions 24 contains data from which a principal communication direction of the antenna 2 can be derived in order to provide, improve, or at least be closer to being able to provide a wireless communications link between the antenna 2 and the electromagnetic signal source 8 when the device 1 is at the location 26 with which the steering data portion is associated. It may be that more than one terrestrial electromagnetic signal source is detectable by the device 1 at a said location, and it may be that steering data is provided for each detectable electromagnetic signal source, or for the electromagnetic signal source which provides the highest quality wireless communications link, at that location. The locations 26 with which the steering portions are associated may be respective single (two or three dimensional) points in space (e.g. represented by location co-ordinates as shown in FIG. 5) or loci of points (e.g. represented by ranges of location co-ordinates).

The controller 6 selects a steering data portion 24 from the user profile 21 taking into account the determined location of the device 1 and uses the selected steering data portion 24 to determine an adjusted principal communication direction of the antenna. The controller 6 then adjusts the principal communication direction of the antenna based on the determined adjusted principal communication direction. There are different types of steering data which can be provided to the controller in order to determine the adjusted principal communication direction of the antenna 2 which is required to provide a suitable wireless communications link. Some examples are described as follows.

In one example, one or more or each of the steering data portions 24 provides estimates of the locations of one or more electromagnetic signal sources which are detectable by the device 1 at the location 26 associated with that steering data portion 24 (which will be assumed to include the electromagnetic signal source 8). The controller 6 determines the location of the device 1 from the location sensor 20, selects a steering data portion 24 relating to that location, the steering data portion 24 comprising an estimated location of the electromagnetic signal source 8, and calculates the adjusted principal communication direction of the antenna 2 taking into account the estimated locations of both the device 1 and the electromagnetic signal source 8 (e.g. in order to align the principal communication direction of the antenna 2 with the line of shortest distance to the electromagnetic signal source 8). The controller 6 then adjusts the principal communication direction of the antenna 2 accordingly, thereby bringing the antenna 2 into communication with the electromagnetic signal source 8 (if it wasn't already) or to thereby improve the quality of the wireless communications link between them (as the case may be). This is illustrated in FIG. 6 which shows the misaligned principal communication direction of FIG. 2 as a dashed line, and the adjusted principal communication direction as a solid line.

In another example, one or more or each of the steering data portions 24 provides an estimate of a principal communication direction of the antenna 2 for providing a wireless communications link between the antenna 2 and the electromagnetic signal source 8 (or a different electromagnetic signal source, for example if it provides a better wireless communications link with the antenna) at the location 26 with which it is associated. The controller 6 determines the location of the antenna 2 from the location sensor data and obtains the principal communication direction of the antenna 2 by selecting a steering data portion 24 associated with that location 26.

In another example, one or more or each of the steering data portions 24 provide estimates of a direction of the electromagnetic signal source 8 relative to the device 1 at the location 26 with which it is associated. The controller 6 determines the location of the device 1 and obtains the direction of the electromagnetic signal source 8 relative to the device 1 by selecting a steering data portion associated with that location. The controller 6 then steers the antenna 2 in the said direction.

In another example one or more or each of the steering data portions 24 provide configuration data (e.g. individually selectable beamforming coefficients and/or weightings) which, when the antenna 2 is at the location 26 associated with that steering data portion 24, can be used (e.g. directly) by the controller 6 to configure antenna 2 so that its principal communication direction points towards the electromagnetic signal source 8 (or to otherwise steer the antenna 2 into communication with the electromagnetic signal source 8 (if it wasn't already) or to improve the quality of the wireless communications link between them).

When the principal communication direction of the antenna 2 has been adjusted, the controller 6 determines one or more parameters indicative of a quality of the wireless communications link between the antenna 2 and the electromagnetic signal source 8, for example from data obtained from baseband circuitry 27 of the device 1 or alternatively (and preferably) by processing signals received (more directly) from the analogue receiver circuitry as discussed above. The controller 6 then iteratively adjusts (fine tunes) the principal communication direction 7 of the antenna 2 until the wireless communications link between the antenna 2 and the electromagnetic signal source 8 meets one or more link quality criteria (e.g. to achieve a particular bit rate, bit error rate, signal to noise ratio, received signal strength etc).

In an alternative embodiment, rather than using a current location of the antenna 2 to adjust the principal communication direction 7 of the antenna, it may be that the controller 6 is configured to predict a future location of the antenna 2 and to adjust the principal communication direction 7 of the antenna 2 in order to provide a wireless communications link at the predicted future location. The controller 6 determines the adjusted principal communication direction in advance of the device 1 reaching the predicted future location. The controller 6 may then adjust the principal communication direction accordingly responsive to a determination that the device 1 has reached the predicted future location, or alternatively the controller 6 may be adjust the principal communication direction 7 of the antenna 2 in advance of the device 1 reaching the predicted future location.

In order to predict a future position of the device 1, the controller 6 compares successive estimates of the location of the device 1 from the location sensor 20. The controller 6 also measures the speed and direction of movement of the device 1 from the said successive estimates of the location of the device 1 from the location sensor, and uses the said measured speed and direction of movement of the device 1 (together with its current location) to predict the said future position of the device 1.

In order to more accurately estimate the location of the antenna 2, and therefore more accurately adjust the principal communication direction of the antenna 2 and obtain a higher quality wireless communications link with the electromagnetic signal source 8, it may be that the user profile 21 comprises data indicative of one or more patterns of movement of the user associated with the user profile 21. For example, the user profile 21 may comprise data indicative of one or more paths or routes previously followed by the user (e.g. when carrying the said device 1 or when carrying a different device which is also associated with the user). The controller 6 determines that the device 1 is following a said path or route by determining that the device 1 occupies a location (or two or more successive locations) on the path or route, or that the device 1 is approaching the said path or route. Time information may also be taken into account (e.g. the path or route may be associated with one or more times, and it may be determined that the device 1 is following the said path or route responsive to a determination that a current time matches a time associated with the said path or route). The controller 6 then predicts the said future location of the device along the said path or route (or at a source or destination of the said path or route). The principal communication direction of the antenna 2 is then adjusted on the assumption that the antenna 2 is on the said path or route.

As an alternative to using the location sensor 20 (which may be unavailable or use significant battery power), the location of the antenna 2 can be determined (together with speed and direction) from sensor data provided by one or more sensors 37 of the device 1 configured to detect movement of the device 1, such as one or more of: accelerometer; magnetometer; compass; gyroscope. For example, such sensors may be used to provide estimates of the location of the device 1 by pedometer dead reckoning.

As illustrated in FIG. 3, a change in the orientation of the antenna 2 (and thus the orientation of the device 1) also affects the alignment between the antenna 2 and the electromagnetic signal source 8. Accordingly, the controller 6 also receives orientation information (typically pitch, yaw and roll of the device 1) from one or more orientation sensors 28 of the device 1, and takes the orientation of the antenna 2 into account (together with location as discussed above) when determining the adjusted principal communication direction 7 of the device 1. This helps to provide, or improve the quality of, a wireless communications link between the antenna 2 and the electromagnetic signal source 8, as shown in FIG. 7 which shows the misaligned principal communication direction of FIG. 3 as a dashed line, and the adjusted principal communication direction as a solid line. The orientation sensors 28 typically comprise any one or more of: accelerometer, gyroscope, compass, magnetometer.

The orientation of the antenna 2 can be taken into account by the controller 6 in different ways. In one example, one or more or each of the steering data portions 24 is also associated with an orientation of the antenna 2 (e.g. by being associated with an orientation of the device 1). The controller 6 then determines the orientation of the antenna 2 (e.g. by determining the orientation of the device 1) and selects a steering data portion associated with the determined location of the antenna 2 (or of the device 1 comprising the antenna 2). The controller 6 then determines and compensates for any difference in the determined orientation of the antenna 2 and the orientation associated with the steering data portion 24 when determining the adjusted principal communication direction 7 of the antenna 2.

In another example, the location specific steering data comprises steering data portions 24 for each of a plurality of different orientations of the antenna 2 for each location 26. In this case, the controller 6 selects a steering data portion 24 associated with both the determined location of the antenna 2 and its received orientation, and uses the selected steering data portion 24 to determine the adjusted principal communication direction 7 of the antenna 2.

In order to take into account other factors which may affect the optimum principal communication direction of the antenna 2 in relation to the electromagnetic signal source 8, the controller 6 receives sensor data from a plurality of sensors, including one or more proximity sensors 30, pressure sensors 32 and temperature sensors 34. The controller 6 then also (e.g. in addition to location, and typically the orientation of the device 1) takes the sensor data into account when determining the adjusted principal communication direction of the antenna 2.

When a user is in close proximity to the antenna 2, a higher quality wireless communications link may be achieved with the electromagnetic signal source 8 if the principal communication direction of the antenna 2 points away from the user, even if that means also directing the antenna 2 away from the electromagnetic signal source 8 (e.g. to instead align the antenna 2 with a reflected signal propagation path to or from the signal source 8). Accordingly, proximity sensor data can be useful when determining the adjusted principal communication direction of the antenna 2. In one example, different steering data portions 24 can be provided in the user profile 21 for situations in which the user is in close proximity to the antenna 2 and for situations in which the user is not in close proximity to the antenna. In this case, the controller 6 selects one of the former steering data portions 24 responsive to a determination from the proximity sensor data that the user is in close proximity to the antenna 2 and one of the latter steering data portions 24 responsive to a determination from the proximity sensor data that the user is not in close proximity to the antenna 2.

Additionally or alternatively, the controller may determine from proximity sensor data the relative direction of one or more (typically external) objects in close proximity to the antenna. For example, it may be that the proximity sensor uses one or more directional electromagnetic signal sources (e.g. infrared LED) to transmit electromagnetic radiation in a given direction, and one or more directional photodetectors to detect reflected radiation from one or more objects in close proximity to the antenna. When an object is detected, it can be deduced that the direction of the said object relative to the antenna corresponds with the transmission direction of the electromagnetic signal source. This direction information can be taken into account when determining the adjusted the principal communication direction of the antenna 2 (e.g. the antenna radiation may be directed away from the direction of the object).

The said one or more pressure and one or more temperature sensors 32, 34 are typically provided on (or at least in communication with) an external surface of the housing of the device 1. By detecting pressure and temperature at one or more portions of the external surface of the housing, the way in which the user is holding the device 1 (or indeed whether the device 1 is being held at all) can be determined. The way in which the user is holding the device (e.g. positions of the user's fingers on the external surface of the housing of the device) may be indicative of an orientation of the device and/or a proximity of the user to the device. The controller 6 therefore takes sensor data from the pressure and temperature sensors into account when determining the adjusted principal communication direction of the antenna 2. For example, it may be that each of one or more steering data portions 24 is associated with a condition that selected temperature sensors 34 of the device 1 detect temperatures greater than a threshold temperature (which may indicate that the device is being held in a particular way, from which an orientation of the antenna 2 can be deduced) and the steering data portion 24 associated with that condition provides antenna configuration data suitable for adjusting the principal communication direction 7 to direct radiation to (or receive radiation from) the electromagnetic signal source 8 when the antenna 2 is at that orientation.

Another parameter which the controller 6 takes into account when adjusting the principal communication direction of the antenna is usage mode data indicative of a usage mode of the device 1, such as: voice call mode, video call mode, browsing internet mode, watching video mode, download mode, upload mode. The controller 6 receives usage mode data indicative of a usage mode of the device 1 from a usage mode sensor of the operating system 36. The usage mode of the device 1 is typically indicative of the orientation of the device which, as shown in FIG. 3, affects the direction of the electromagnetic signal source relative to the antenna. The usage mode of the device can also be used to determine a proximity of the user to the antenna 2. For example, the controller 6 may deduce that a user is in close proximity to the antenna 2 when the device 1 is in the voice call usage mode. Thus, by taking the usage mode of the device 1 into account, the controller 6 can determine a more optimum adjusted principal communication direction of the antenna 2.

The controller 6 may also be configured to take into account whether one or more device peripherals are being used (or whether one or more device peripherals are coupled to the device by way of one or more ports) when deducing the proximity of a user to the antenna 2. In the voice call usage mode example, the controller may be configured to deduce that a user is in close proximity to the device responsive to a determination (e.g. from a headphone sensor) that no headphones are plugged in to the device 1 (indicating that hands free is not being used) and that a loudspeaker of the device 1 is switched off (indicating that speaker phone is not being used).

The usage mode of the device 1 can be taken into account by the controller 6 in different ways. In one example, one or more or each of the steering data portions 24 are also associated with a usage mode of the device 1, and the controller 6 is configured to select a steering data portion 24 associated with the determined usage mode of the device 1. In another example, the user profile 21 comprises usage mode data which is indicative of one or more parameters specific to (and typically associated with) each of one or more usage modes. For example, the usage mode specific parameters may comprise (for each of one or more usage modes): an orientation of the device; a proximity of a user to the device; a location of the user relative to the antenna; an antenna steering configuration or direction. One or more of the usage mode specific parameters may be location specific. For example, the usage mode specific parameters may comprise a location of an electromagnetic signal source (e.g. wifi access point or cellular communication system base station) with which the antenna communicates in a particular usage mode when the antenna is at a particular location. The usage mode parameters are also typically specific to a or the user of the device (indeed, the said parameters are typically derived from prior use of the antenna by the user). The controller 6 takes the said parameters associated with a usage mode into account when determining the adjusted principal communication direction of the antenna 2, responsive to a determination that the device 1 is being used in the said usage mode.

It will be understood that the wireless communications device 1 may be configured to communicate with a plurality of electromagnetic signal sources of different types, such as a Wi-Fi access point, a Bluetooth beacon and a cellular network base station. It may be that the user profile 21 stores location specific steering data for one (typically two) or more types of electromagnetic signal source. In this case, the steering data portions 24 are typically each associated with a type of communication and the controller 6 is configured to receive a communications type which the antenna 2 is trying to perform (e.g. from the Media Access Control (MAC) layer of the baseband circuitry 16) and to select a steering data portion 24 associated with the received communications type.

The controller 6 is also typically configured to receive frequency channel data from the baseband circuitry 27 indicative of a frequency channel on which the antenna is communicating with the electromagnetic signal source 8. The frequency channel data can be used to select steering data from the user profile 21 which is associated with the said frequency channel on which the antenna is communicating. For example, the user profile 21 may comprise data specifying a particular steering configuration for the antenna 2 when it communicates on a particular WiFi frequency channel at a particular location which reduces interference with other WiFi communications (e.g. on that or an adjacent channel) typically occurring at that location.

It may be that the power amplifier 12 and/or the low noise amplifier of the RF front end have tunable frequency responses. It may be that the controller 6 is also configured to use the frequency channel data to adjust the frequency response of the power amplifier 12 and/or the low noise amplifier (not shown) to thereby improve the performance of the amplifier at one or more frequencies of the said frequency channel. This is particularly important when the frequency channel is at the periphery of a frequency range comprising all available frequency channels for a particular wireless communications type, typically because by default the frequency response of the amplifier is tuned for peak performance at the centre of the said frequency range. Accordingly, by adjusting the frequency response of the amplifier taking into account the said frequency channel, the quality of the communications link between the antenna 2 and the electromagnetic signal source 8 is improved. The frequency channel data can also be used to tune the frequency response of the filter 18.

Figure 8:
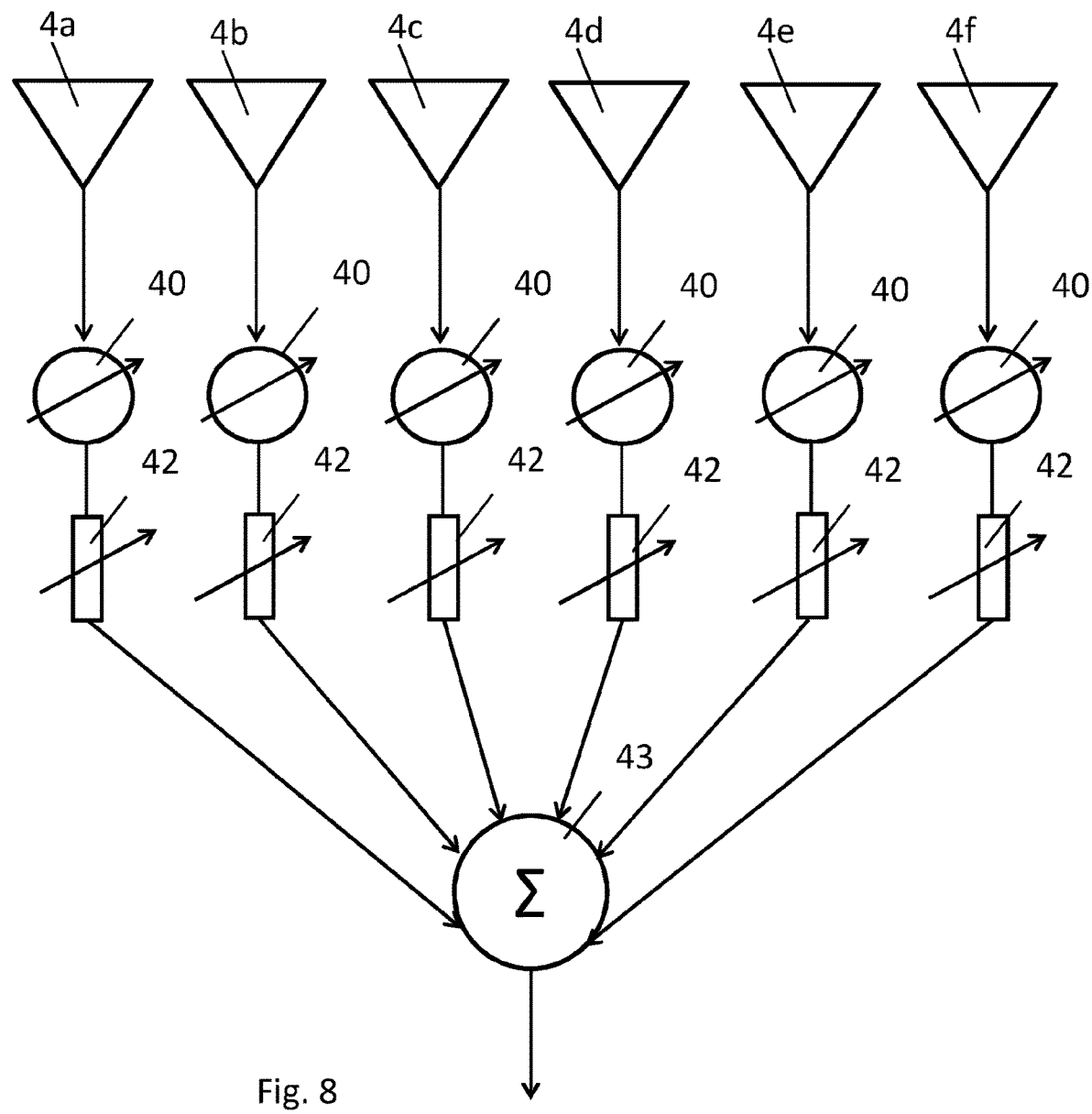
FIG. 8 is a block diagram illustrating a beamforming algorithm for directionally combining the signals from the elements of the antenna of FIGS. 1 to 3, 6 and 7.

As indicated above, the principal communication direction of the antenna 2 is typically adjusted by beamforming (although it will be appreciated that an alternative steerable directional antenna, such as a mechanically rotatable directional antenna or a sector antenna could instead be employed). Beamforming for a received signal is illustrated in FIG. 8, but it will be understood that beamforming for a transmitted signal operates on similar principles. The antenna elements 4a-4f are each in communication with a variable phase shifter 40 which is configured by the controller 6 to apply a selectable phase shift to signals received from the respective antenna element. Next, the phase shifted signal is input to a signal weighting algorithm 42 which applies a selectable weighting to each of the respective phase shifted signals. Next, the weighted, phase shifted signals are summed together by a summing algorithm 43. By controlling the phase shifts and weightings applied to the signals received by each antenna element 4a-4f (which are typically different from each other), the controller 6 controls the principal communication direction 7 of the antenna 2.

The weightings applied by the weighting algorithm 42 also determine the amplification of signals provided to (for transmission by), and received by, the antenna 2. Accordingly, the weightings applied by the weighting algorithm 42 can be used to adjust the amplification of signals provided to (for transmission by), and received by, the antenna 2 (and so the weighting algorithm can be considered to be an antenna amplifier configured to amplify signals to be transmitted or received by the antenna). In the event that a mechanically rotatable or sector antenna is provided, it may be that an additional antenna amplifier (typically separate from the power amplifier 12 and the low noise amplifier of the RF front end) is provided which amplifies signals provided to (for transmission by), and received by, the antenna 2.

The controller 6 is configured to control the level of amplification provided to the signals provided to (for transmission by), and received by, the antenna 2 by way of the individually selectable beamforming weightings or by way of the gain of the additional antenna amplifier as the case may be.

The user profile 21 stores power level data indicative of respective power level configurations of the antenna amplifiers (e.g. which enable the antenna to communicate with the terrestrial electromagnetic signal source from the locations with which they are associated in the user profile 21), such as the beamforming weightings or gains of the additional amplifier and/or the power amplifier and/or the low noise amplifier. The controller 6 selects power level data from the user profile 21 responsive to the determined location of the device 1, and determines a signal gain and/or an amplification level to be applied (or signal amplitudes to be provided) by the beamforming weightings or by the additional antenna amplifier and/or the power amplifier and/or the low noise amplifier taking into account the selected power level data. This helps to reduce unproductive battery power consumption on the device by, for example, unnecessarily over-amplifying the signals for transmission by the antenna 2.

The controller 6 may also take into account sensor data received from one or more of the sensors of the device 1 when determining the signal gain and/or amplification level and/or signal amplitude provided by the antenna amplifiers. For example, sensor data from the proximity sensor 30 may indicate that a user is in close proximity to the antenna and that, as a result, the adjusted principal communication direction does not point directly at the terrestrial electromagnetic signal source 8. Accordingly, it may be necessary to increase the power level to compensate. The signal gain and/or amplification level and/or signal amplitude provided by one or more or each of the antenna amplifiers may then be iteratively adjusted to meet a or the target quality of wireless communications link between the antenna 2 and the said terrestrial electromagnetic signal source 8. Typically, the said power level data is derived from prior usage of the antenna 2 by the user.

In another example, usage mode data from the usage mode sensor may indicate that the antenna 2 is required to download a large quantity of data and so requires a wireless communications link to be provided which permits high data transfer rates. In this case, the controller 6 takes into account the usage mode data and provides an increased level of amplification, e.g. by adjusting the beamforming weightings or the gain of the additional antenna amplifier (and/or by increasing the amplification of the low noise amplifier for example) accordingly in order to provide the required high data transfer rate.

Where the controller 6 controls the level of amplification provided by the power amplifier 12 as well as the beamforming weightings or the gain of the additional amplifier, the controller 6 typically controls the level of amplification provided by the power amplifier 12 taking into account the amplification provided by the beamforming weightings or the gain of the additional antenna amplifier.

Similarly, where the controller 6 controls the level of amplification provided by the low noise amplifier as well as the beamforming weightings or the gain of the additional amplifier, the controller 6 typically controls the level of amplification provided by the low noise amplifier taking into account the amplification provided by the beamforming weightings or the gain of the additional antenna amplifier.

In order to generate the user profile 21, to dynamically update the user profile over time, and of course to communicate with the electromagnetic signal source when the antenna occupies a location in respect of which the user profile lacks (suitably accurate) steering data, the controller 6 adjusts the principal communication direction of the antenna across a range of principal communication directions until a (typically radio frequency) wireless communications link between the antenna and a terrestrial electromagnetic signal source is obtained which meets one or more link criteria. For example, the link criteria may comprise: that a wireless communications link has been established between the antenna 2 and the terrestrial electromagnetic signal source (e.g. when previously there was no such link); that a wireless communications link has been established between the antenna 2 and the terrestrial electromagnetic signal source 8 having a bit rate exceeding a predetermined threshold; that a wireless communications link has been established between the antenna 2 and the terrestrial electromagnetic signal source 8 having a bit error rate below a predetermined threshold; that a wireless communications link has been established between the antenna and the terrestrial electromagnetic signal source having a signal to noise ratio above a predetermined threshold; or that a wireless communications link has been established between the antenna and the terrestrial electromagnetic signal source having a received signal strength greater than a predetermined threshold.

To assist in this process, the controller 6 may be configured to obtain assistance data from a general database 45 (which may be provided on the memory of the device, the memory of one or more server computers with which the device can communicate or a combination of a memory of the device and a memory of one or more server computers with which the device can communicate). The assistance data typically comprises locations of electromagnetic signal sources, which are typically identified in the general database 45 by identifiers such as MAC addresses. When the antenna 2 detects electromagnetic signals from an electromagnetic signal source, it obtains the identifier of the electromagnetic signal source from the detected signals and uses the identifier to interrogate the general database 45 to determine a location of the electromagnetic signal source. The controller 6 then uses this information (together with any other available data such as orientation of the device, sensor data, usage mode data etc as discussed herein above) to calculate the adjusted principal communication direction and to adjust the principal communication direction of the antenna in accordance with the adjusted principal communication direction. This is typically a slower process and is less power efficient than obtaining steering data from the user profile 21, but is typically quicker and more power efficient than performing a full scan across all possible principal communication directions of the antenna to determine the optimum adjusted principal communication direction.

The location of the device 1 when the said wireless communications link was achieved (received from location sensor 20) is stored in a memory of the device together with steering data related to, or derived from, the said adjusted principal communication direction and an identifier (e.g. MAC address) of the electromagnetic signal source 8. As discussed above, the steering data may comprise any of, for example: an estimated location of the said terrestrial electromagnetic signal source 8; antenna configuration data representing the said adjusted principal communication direction of the antenna; and data representing the adjusted principal communication direction.

The controller 6 also stores data representing the said orientation of the antenna 2 (determined from the said orientation sensor of the device) together with said steering data and location. The controller 6 may also store: a usage mode of the device 1; a frequency channel of the wireless communications link; and/or a communications type of the wireless communications link; a quality of the said wireless communications link; and/or the strength of signals received from the electromagnetic signal source. The controller 6 may also store power level data indicative of respective power level configurations of one or more antenna amplifiers configured to adjust a power level of (e.g. amplify) signals to be transmitted and/or received by the antenna (e.g. which enable the antenna to communicate with the terrestrial electromagnetic signal source from the said locations). It will be understood that the respective antenna amplifiers may have gains which are greater than unity, less than unity or unity. Accordingly, the respective antenna amplifiers may comprise one or more signal boosters and/or one or more signal attenuators. For example, the power level data may comprise the beamforming weightings or the gain of the additional antenna amplifier (where provided). Additionally or alternatively the power level data may comprise the gain of the power amplifier 12 and/or the gain of the low noise amplifier when the link criteria were met.

Figure 9:
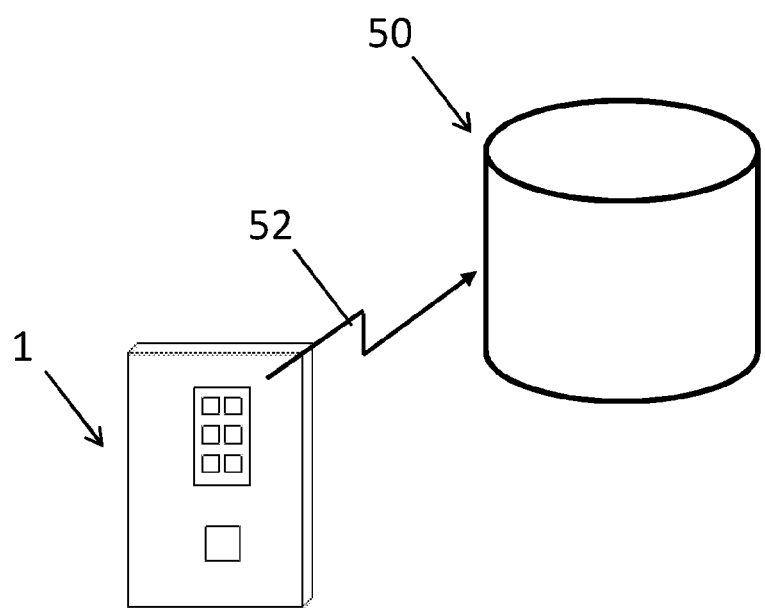
FIG. 9 is a schematic diagram of the device of FIGS. 1 to 3, 6 and 7 in communication with a server computer.

As illustrated in FIG. 9, the controller 6 initially stores steering data (and any additional data—e.g. orientation data, proximity data, usage mode data, power level data, frequency channel data, communications type data, data indicating the quality of the wireless communications link with or received signal strength from the electromagnetic signal source) on its local memory and then uploads the steering data (and any additional data) stored on its local memory to a server computer 50 over a communications link 52, typically as a batch update in which a plurality of sets of steering data (and associated additional data) are uploaded to the server 50. Before uploading data to the server computer 50, a check may be performed by the controller 6 as to whether a battery level of the device is above a predetermined threshold and, if so, to proceed with the upload. If the battery power is below the threshold, it may be that the controller 6 does not upload the data to the server 50, at least until the battery level is again above the threshold. The battery level data may be determined from an operating system 36 running on the device 1.

By generating the user profile 21 from usage of the antenna 2 by the user, it is ensured that the steering data provided in the user profile 21 is specific to that user. Accordingly, only steering data relevant to the user is stored, and the steering data selected to adjust the principal communication direction of the antenna in use is typically more accurate for that user.

Again to preserve battery life, when the principal communication direction is being iteratively adjusted to optimise the quality of the wireless communications link between the antenna 2 and the electromagnetic signal source 8, it may be that the controller is configured to adjust the principal communication direction of the antenna across only a subset of a possible range of principal communication directions of the antenna responsive to a determination that the battery level is below a or the predetermined threshold.

It will be understood that the sensors may be implemented in software (e.g. a usage mode sensor may be a signal from an operating system running on the device indicating whether the device is being used to make a call), hardware or in a combination of hardware and software.

It may be that the controller adjusts the principal communication direction of the antenna responsive to a detected movement of the device (e.g. change of orientation or location). Alternatively, it may be that the controller 6 is configured to adjust the principal communication direction 7 at regular time intervals, using the most recently estimated location of the device 1 from the location sensor 20 in each case.

Further modifications and variations may be made within the scope of the invention herein disclosed.

For example, although (for simplicity) FIGS. 2, 3, 6 and 7 and their associated descriptions may imply that the optimum principal communication direction of the antenna is always to align the principal communication direction with a line of sight to the electromagnetic signal source 8, it will be understood that in some circumstances the optimum principal communication direction of the antenna is along a path (e.g. comprising one or more signal reflections) which does not lie on a line of sight to the electromagnetic signal source 8 from the antenna 2. In practice the steering data portions 24 provided in the user profile 21 store data from which the determined optimum principal communication direction can be derived, whether it lies on a line of sight to the electromagnetic signal source or not.

In another example, although the above description states that the user profile 21 is received by the controller 6, it may be that only a portion of the user profile 21 is received by the controller 6. It may be that the said portion of the user profile 21 is selected on the basis of the determined location of the device 1. For example, the said portion of the user profile 21 may be a portion of the user profile 21 relating to a geographical region comprising the determined location of the device 1. In this case, it may be that the said steering data portion is selected from the said portion of the user profile 21.

In other embodiments, it may be that the location specific steering data is obtained from a database of location specific steering data (which may not be user specific). In this case, rather than selecting the steering data portion from the user profile 21, the controller 6 may be configured to receive the database of location specific steering data, or a portion thereof (e.g. selected on the basis of the determined location of the device 1, such as by selecting a portion of the database specific to a geographical region comprising the determined location of the device), and to select the said steering data portion from the said database or portion thereof.

Various embodiments of the invention are described by the numbered Clauses below:

1. A method of adjusting a principal communication direction of a steerable directional antenna for communicating with a terrestrial electromagnetic signal source, the method comprising: providing location specific steering data comprising one or more steering data portions, each of the steering data portions being specific to a respective location; determining a location of the steerable directional antenna; selecting a steering data portion from the location specific steering data taking into account the determined location of the antenna; determining an adjusted principal communication direction of the steerable directional antenna taking into account the said selected steering data portion; and adjusting the principal communication direction of the steerable directional antenna in accordance with the said adjusted principal communication direction.
2. The method according to clause 1 wherein one or more or each of the steering data portions are derived from prior usage of the antenna by a user.
3. The method according to clause 1 or clause 2 wherein the said location specific steering data is provided in a user profile which is customised for a or the said user.
4. The method according to any one preceding clause further comprising selecting a said steering data portion from the location specific steering data and/or determining the said adjusted principal communication direction of the steerable directional antenna taking into account sensor data from one or more sensors.

5. The method according to any one preceding clause further comprising: determining an orientation of the antenna; and selecting the said steering data portion from the location specific steering data taking into account the determined orientation of the antenna.
6. The method according to any one preceding clause further comprising: determining an orientation of the antenna; and determining the said adjusted principal communication direction of the steerable directional antenna taking into account the determined orientation of the antenna.
7. The method according to any one preceding clause further comprising: selecting the said steering data portion from the location specific steering data, and/or determining the said adjusted principal communication direction of the steerable directional antenna, taking into account sensor data from one or more proximity sensors.
8. The method according to any one preceding clause further comprising: selecting the said steering data portion from the location specific steering data and/or determining the said adjusted principal communication direction of the steerable directional antenna taking into account sensor data from one or more pressure sensors and/or one or more temperature sensors.
9. The method according to any one preceding clause further comprising: determining a usage mode of a or the device comprising the antenna; and selecting a steering data portion from the location specific steering data taking into account the determined usage mode of the device.
10. The method according to any one preceding clause further comprising: determining a usage mode of a or the device comprising the antenna; and determining the adjusted principal communication direction of the steerable directional antenna taking into account the determined usage mode of the device.
11. The method according to any one preceding clause further comprising: detecting motion of the antenna; and selecting the said steering data portion from the location specific steering data taking into account the detected motion of the antenna.
12. The method according to any one preceding clause further comprising: detecting motion of the antenna; and determining the adjusted principal communication direction of the steerable directional antenna taking into account the detected motion of the antenna.
13. The method according to any one preceding clause further comprising: providing location specific power level data comprising one or more power level data portions, each of the power level data portions being specific to each of one or more locations, the said power level data portions being indicative of respective power level configurations of one or more antenna amplifiers configured to amplify signals to be transmitted or received by the antenna; selecting a power level data portion from the said power level data taking into account the determined location of the device; determining a power level configuration of the antenna amplifier(s) taking into account the selected power level data portion; and configuring the antenna amplifier(s) in accordance with the said determined power level configuration.
14. The method according to any one preceding clause further comprising: selecting the said steering data portion taking into account a type of communication performed by the antenna and/or by the terrestrial electromagnetic signal source.
15. Steerable directional antenna apparatus comprising:
a steerable directional antenna for communicating with a terrestrial electromagnetic signal source;
a memory comprising location specific steering data comprising one or more steering data portions, each steering data portion being specific to a respective location; and
a controller comprising one or more computer processors, the controller being configured to: determine a location of the steerable directional antenna; select a steering data portion from the location specific steering data taking into account the determined location of the antenna; determine an adjusted principal communication direction of the steerable directional antenna taking into account the said selected steering data portion; and adjust the principal communication direction of the steerable directional antenna in accordance with the said adjusted principal communication direction.
16. A method of generating location specific steering data for a steerable directional antenna, the location specific steering data comprising one or more steering data portions, each of the steering data portions being specific to a respective location, the method comprising: providing the said steerable directional antenna at a location; adjusting a principal communication direction of the antenna to thereby provide a wireless communications link between the antenna and a terrestrial electromagnetic signal source meeting one or more link criteria; and storing the said location together with a steering data portion related to, or derived from, the said adjusted principal communication direction.
17. The method according to clause 16 wherein the said steering data portion comprises any one or more of: an estimated location of the said terrestrial electromagnetic signal source; antenna configuration data representing the said adjusted principal communication direction of the antenna; and data representing the adjusted principal communication direction.
18. The method according to clause 16 or clause 17 further comprising: determining an orientation of the antenna; and storing data representing the said orientation of the antenna together with said steering data portion and location.
19. The method according to any one of clauses 16 to 18 further comprising: determining a usage mode of a device comprising the antenna; and storing usage mode data representing the said usage mode together with said steering data portion and location.
20. Steerable directional antenna apparatus comprising: a steerable directional antenna; a memory; and a controller comprising one or more computer processors, the controller being configured to: determine a location of the antenna; adjust a principal communication direction of the antenna to thereby provide a wireless communications link between the antenna and a terrestrial electromagnetic signal source meeting one or more link criteria; and store in the memory the said location together with a steering data portion related to, or derived from, the said adjusted principal communication direction.
21. A non-transitory computer readable medium tangibly embodying computer program code for causing a computer to adjust a principal communication direction of a steerable directional antenna for communicating with a terrestrial electromagnetic signal source by: receiving location specific steering data comprising one or more steering data portions, each of the steering data portions being specific to a respective location; receiving a location of the steerable directional antenna; selecting a steering data portion from the location specific steering data taking into account the received location of the antenna; determining an adjusted principal communication direction of the steerable directional antenna taking into account the said selected steering data portion; and adjusting the principal communication direction of the steerable directional antenna in accordance with the said adjusted principal communication direction.

22. A non-transitory computer readable medium tangibly embodying computer program code for causing a computer to generate location specific steering data for a steerable directional antenna, the location specific steering data comprising one or more steering data portions, each of the steering data portions being specific to a respective location, by: receiving a location of the antenna; adjusting a principal communication direction of the antenna to thereby provide a wireless communications link between the antenna and a terrestrial electromagnetic signal source meeting one or more link criteria; and storing the said location together with a steering data portion related to, or derived from, the said adjusted principal communication direction.

The invention claimed is:

1. A method of adjusting a principal communication direction of a steerable directional antenna for communicating with a terrestrial electromagnetic signal source, the method comprising: providing location specific steering data comprising one or more steering data portions, each of the steering data portions being specific to a respective location; determining a location of the steerable directional antenna; selecting a steering data portion from the location specific steering data taking into account the determined location of the antenna; determining an adjusted principal communication direction of the steerable directional antenna taking into account the said selected steering data portion; and adjusting the principal communication direction of the steerable directional antenna in accordance with the said adjusted principal communication direction, wherein the method further comprises providing location specific power level data comprising one or more power level data portions, each of the power level data portions being specific to each of one or more locations, the said power level data portions being indicative of respective power level configurations of one or more antenna amplifiers configured to adjust a power level of signals to be transmitted or received by the antenna; selecting a power level data portion from the said power level data taking into account the determined location of the antenna; determining a power level configuration of the antenna amplifier(s) taking into account the selected power level data portion; and configuring the antenna amplifier(s) in accordance with the said determined power level configuration; and wherein one or more or each of the steering data portions are derived from prior usage of the antenna by a user.

2. The method according to claim 1 further comprising selecting a said steering data portion from the location specific steering data and/or determining the said adjusted principal communication direction of the steerable directional antenna taking into account sensor data from one or more sensors.

3. The method according to claim 1 further comprising: determining a usage mode of a or the device comprising the antenna; and selecting a steering data portion from the location specific steering data taking into account the determined usage mode of the device.

4. The method according to claim 1 further comprising: determining a usage mode of a or the device comprising the antenna; and determining the adjusted principal communication direction of the steerable directional antenna taking into account the determined usage mode of the device.

5. The method according to claim 1 further comprising: detecting motion of the antenna; and selecting the said steering data portion from the location specific steering data taking into account the detected motion of the antenna.

6. The method according to claim 1 further comprising: detecting motion of the antenna; and determining the adjusted principal communication direction of the steerable directional antenna taking into account the detected motion of the antenna.

7. The method according to claim 1 further comprising: selecting the said steering data portion taking into account a type of communication performed by the antenna and/or by the terrestrial electromagnetic signal source.

8. The method according to claim 1 wherein the selected steering data portion is specific to a future location of the antenna predicted taking into account the said determined location of the antenna.

9. The method according to claim 1 wherein each said steering data portion is associated with an expected link quality of a wireless communications link between the antenna and the electromagnetic signal source.

10. The method according to claim 9 wherein the method further comprises: comparing a current link quality of a wireless link between the said antenna and the electromagnetic signal source with the said expected link quality; and selecting the said steering data portion responsive to a determination that the expected link quality is greater than the said current link quality.

11. The method according to claim 1 wherein the said one or more antenna amplifiers configured to adjust a power level of signals to be transmitted or received by the antenna are configured to amplify signals to be transmitted or received by the antenna.

12. A method of adjusting a principal communication direction of a steerable directional antenna for communicating with a terrestrial electromagnetic signal source, the method comprising: providing location specific steering data comprising one or more steering data portions, each of the steering data portions being specific to a respective location; determining a location of the steerable directional antenna; selecting a steering data portion from the location specific steering data taking into account the determined location of the antenna determining an adjusted principal communication direction of the steerable directional antenna taking into account the said selected steering data portion; and adjusting the principal communication direction of the steerable directional antenna in accordance with the said adjusted principal communication direction, wherein the method further comprises providing location specific power level data comprising one or more power level data portions, each of the power level data portions being specific to each of one or more locations, the said power level data portions being indicative of respective power level configurations of one or more antenna amplifiers configured to adjust a power level of signals to be transmitted or received by the antenna; selecting a power level data portion from the said power level data taking into account the determined location of the antenna; determining a power level configuration of the antenna amplifier(s) taking into account the selected power level data portion; and configuring the antenna amplifier(s) in accordance with the said determined power level configuration; and wherein the said location specific steering data is provided in a user profile which is customised for a or the said user.

13. A method of adjusting a principal communication direction of a steerable directional antenna for communication with a terrestrial electromagnetic signal source, the method comprising: providing location specific steering data comprising one or more steering data portions, each of the steering data portions being specific to a respective location; determining a location of the steerable directional antenna; selecting a steering data portion from the location specific steering data taking into account the determined location of the antenna; determining an adjusted principal communication direction of the steerable directional antenna taking into account the said selected steering data portion and adjusting the principal communication direction of the steerable directional antenna in accordance with the said adjusted principal communication direction, wherein the method further comprises providing location specific power level data comprising one or more power level data portions, each of the power level data portions being specific to each of one or more locations, the said power level data portions being indicative of respective power level configurations of one or more antenna amplifiers configured to adjust a power level of signals to be transmitted or received by the antenna; selecting a power level data portion from the said power level data taking into account the determined location of the antenna; determining a power level configuration of the antenna amplifier(s) taking into account the selected power level data portion; and configuring the antenna amplifier(s) in accordance with the said determined power level configuration; and wherein the method further comprises: determining an orientation of the antenna; and selecting the said steering data portion from the location specific steering data taking into account the determined orientation of the antenna, and/or determining the said adjusted principal communication direction of the steerable directional antenna taking into account the determined orientation of the antenna.

14. A method according to claim 13, wherein the determining an orientation of the antenna comprises using sensor data from a gyroscope.

15. A method of adjusting a principal communication direction of a steerable directional antenna for communication with a terrestrial electromagnetic signal source, the method comprising: providing location specific steering data comprising one or more steering data portions, each of the steering data portions being specific to a respective location; determining a location of the steerable directional antenna; selecting a steering data portion from the location specific steering data taking into account the determined location of the antenna determining an adjusted principal communication direction of the steerable directional antenna taking into account the said selected steering data portion; and adjusting the principal communication direction of the steerable directional antenna in accordance with the said adjusted principal communication direction, wherein the method further comprises providing location specific power level data comprising one or more power level data portions, each of the power level data portions being specific to each of one or more locations, the said power level data portions being indicative of respective power level configurations of one or more antenna amplifiers configured to adjust a power level of signals to be transmitted or received by the antenna; selecting a power level data portion from the said power level data taking into account the determined location of the antenna; determining a power level configuration of the antenna amplifier(s) taking into account the selected power level data portion; and configuring the antenna amplifier(s) in accordance with the said determined power level configuration; and wherein the method further comprises: selecting the said steering data portion from the location specific steering data, and/or determining the said adjusted principal communication direction of the steerable directional antenna, taking into account sensor data from one or more proximity sensors.

16. A method of adjusting a principal communication direction of a steerable directional antenna for communicating with a terrestrial electromagnetic signal source, the method comprising; providing location specific steering data comprising one or more steering data portions, each of the steering data portions being specific to a respective location; determining a location of the steerable directional antenna; selecting a steering data portion from the location specific steering data taking into account the determined location of the antenna; determining an adjusted principal communication direction of the steerable directional antenna taking into account the said selected steering data portion; and adjusting the principal communication direction of the steerable directional antenna in accordance with the said adjusted principal communication direction, wherein the method further comprises providing location specific power level data comprising one or more power level data portions, each of the power level data portions being specific to each of one or more locations, the said power level data portions being indicative of respective power level configurations of one or more antenna amplifiers configured to adjust a power level of signals to be transmitted or received by the antenna; selecting a power level data portion from the said power level data taking into account the determined location of the antenna, determining a power level configuration of the antenna amplifier(s) taking into account the selected power level data portion; and configuring the antenna amplifier(s) in accordance with the said determined power level configuration; and wherein the method further comprises: selecting the said steering data portion from the location specific steering data and/or determining the said adjusted principal communication direction of the steerable directional antenna taking into account sensor data from one or more pressure sensors and/or one or more temperature sensors.

17. A method of adjusting a principal communication direction of a steerable directional antenna for communicating with a terrestrial electromagnetic signal source, the method comprising: providing location specific steering data comprising one or more steering data portions, each of the steering data portions being specific to a respective location; determining a location of the steerable directional antenna; selecting a steering data portion from the location specific steering data taking into account the determined location of the antenna; determining an adjusted principal communication direction of the steerable directional antenna taking into account the said selected steering data portion; and adjusting the principal communication direction of the steerable directional antenna in accordance with the said adjusted principal communication direction, wherein the method further comprises providing location specific power level data comprising one or more power level data portions, each of the power level data portions being specific to each of one or more locations, the said power level data portions being indicative of respective power level configurations of one or more antenna amplifiers configured to adjust a power level of signals to be transmitted or received by the antenna; selecting a power level data portion from the said power level data taking into account the determined location of the antenna; determining a power level configuration of the antenna amplifier(s) taking into account the selected power level data portion; and configuring the antenna amplifier(s) in accordance with the said determined power level configuration;

and wherein the method further comprises: determining a frequency channel on which the antenna is communicating with the electromagnetic signal source; and adjusting a frequency response of one or more antenna amplifiers configured to amplify signals to be transmitted and/or received by the antenna taking into account the said frequency channel.

18. Steerable directional antenna apparatus comprising:
a steerable directional antenna for communicating with a terrestrial electromagnetic signal source;
a memory comprising location specific steering data comprising one or more steering data portions, each steering data portion being specific to a respective location; and
a controller comprising one or more computer processors, the controller being configured to: determine a location of the steerable directional antenna; select a steering data portion from the location specific steering data taking into account the determined location of the antenna; determine an adjusted principal communication direction of the steerable directional antenna taking into account the said selected steering data portion; and adjust the principal communication direction of the steerable directional antenna in accordance with the said adjusted principal communication direction,
wherein the memory further comprises location specific power level data comprising one or more power level data portions, each of the power level data portions being specific to each of one or more locations, the said power level data portions being indicative of respective power level configurations of one or more antenna amplifiers configured to adjust a power level of signals to be transmitted and/or received by the antenna;
wherein the controller is further configured to: select a power level data portion from the said power level data taking into account the determined location of the antenna; determine a power level configuration of the antenna amplifier(s) taking into account the selected power level data portion; and configure the antenna amplifier(s) in accordance with the said determined power level configuration; and
wherein the controller is configured: to determine a frequency channel on which the antenna is communicating with the electromagnetic signal source; and to adjust a frequency response of one or more antenna amplifiers configured to amplify signals to be transmitted and/or received by the antenna taking into account the said frequency channel.

19. Steerable directional antenna apparatus according to claim 18 wherein the selected steering data portion is specific to a future location of the antenna predicted taking into account the said determined location of the antenna.

20. Steerable directional antenna apparatus according to claim 18 wherein each said steering data portion is associated with an expected link quality of a wireless communications link between the antenna and the electromagnetic signal source.

21. Steerable directional antenna apparatus according to claim 20 wherein the controller is configured to: compare a current link quality of a wireless link between the said antenna and the electromagnetic signal source with the said expected link quality; and select the said steering data portion responsive to a determination that the expected link quality is greater than the said current link quality.

22. Steerable directional antenna apparatus according to claim 18 wherein the said one or more antenna amplifiers configured to adjust a power level of signals to be transmitted or received by the antenna are configured to amplify signals to be transmitted or received by the antenna.

23. A method of generating location specific steering data for a steerable directional antenna, the location specific steering data comprising one or more steering data portions, each of the steering data portions being specific to a respective location, the method comprising: providing the said steerable directional antenna at a location; adjusting a principal communication direction of the antenna to thereby provide a wireless communications link between the antenna and a terrestrial electromagnetic signal source meeting one or more link criteria; and storing the said location together with a steering data portion related to, or derived from, the said adjusted principal communication direction; wherein the method further comprises; determining orientation of the antenna; and storing data representing; the said orientation of the antenna together with said steering data portion and location.

24. The method according to claim 23 wherein the said steering data portion comprises any one or more of: an estimated location of the said terrestrial electromagnetic signal source; antenna configuration data representing the said adjusted principal communication direction of the antenna; and data representing the adjusted principal communication direction.

25. The method according to claim 23 further comprising: determining a usage mode of a device comprising the antenna; and storing usage mode data representing the said usage mode together with said steering data portion and location.

26. Steerable directional antenna apparatus comprising:
a steerable directional antenna for communicating with a terrestrial electromagnetic signal source;
a memory comprising location specific steering data comprising one or more steering data portions, each steering data portion being specific to a respective location; and
a controller comprising one or more computer processors, the controller being configured to: determine a location of the steerable directional antenna; select a steering data portion from the location specific steering data taking into account the determined location of the antenna; determine an adjusted principal communication direction of the steerable directional antenna taking into account the said selected steering data portion; and adjust the principal communication direction of the steerable directional antenna in accordance with the said adjusted principal communication direction,
wherein the memory further comprises location specific power level data comprising one or more power level data portions, each of the power level data portions being specific to each of one or more locations, the said power level data portions being indicative of respective power level configurations of one or more antenna amplifiers configured to adjust a power level of signals to be transmitted and/or received by the antenna;
wherein the controller is further configured to: select a power level data portion from the said power level data taking into account the determined location of the antenna; determine a power level configuration of the antenna amplifier(s) taking into account the selected power level data portion; and configure the antenna amplifier(s) in accordance with the said determined power level configuration, and wherein one or more or each of the steering data portions are derived from prior usage of the antenna by a user.

27. Steerable directional antenna apparatus comprising:
a steerable directional antenna for communicating with a terrestrial electromagnetic signal source;
a memory comprising location specific steering data comprising one or more steering data portions, each steering data portion being specific to a respective location; and
a controller comprising one or more computer processors, the controller being configured to: determine a location of the steerable directional antenna; select a steering data portion from the location specific steering data taking into account the determined location of the antenna; determine an adjusted principal communication direction of the steerable directional antenna taking into account the said selected steering data portion; and adjust the principal communication direction of the steerable directional antenna in accordance with the said adjusted principal communication direction,
wherein the memory further comprises location specific power level data comprising one or more power level data portions, each of the power level data portions being specific to each of one or more locations, the said power level data portions being indicative of respective power level configurations of one or more antenna amplifiers configured to adjust a power level of signals to be transmitted and/or received by the antenna;
wherein the controller is further configured to: select a power level data portion from the said power level data taking into account the determined location of the antenna; determine a power level configuration of the antenna amplifier(s) taking into account the selected power level data portion; and configure the antenna amplifier(s) in accordance with the said determined power level configuration, and wherein the said location specific steering data is provided in a user profile which is customised for a or the said user.

28. Steerable directional antenna apparatus comprising:
a steerable directional antenna for communicating with a terrestrial electromagnetic signal source;
a memory comprising location specific steering data comprising one or more steering data portions, each steering data portion being specific to a respective location; and
a controller comprising one or more computer processors, the controller being configured to: determine a location of the steerable directional antenna; select a steering data portion from the location specific steering data taking into account the determined location of the antenna; determine an adjusted principal communication direction of the steerable directional antenna taking into account the said selected steering data portion; and adjust the principal communication direction of the steerable directional antenna in accordance with the said adjusted principal communication direction,
wherein the memory further comprises location specific power level data comprising one or more power level data portions, each of the power level data portions being specific to each of one or more locations, the said power level data portions being indicative of respective power level configurations of one or more antenna amplifiers configured to adjust a power level of signals to be transmitted and/or received by the antenna;
and wherein the controller is further configured to: select a power level data portion from the said power level data taking into account the determined location of the antenna; determine a power level configuration of the antenna amplifier(s) taking into account the selected power level data portion; and configure the antenna amplifier(s) in accordance with the said determined power level configuration, and to determine an orientation of the antenna; and select the said steering data portion from the location specific steering data, and/or determine the said adjusted principal communication direction of the steerable directional antenna, taking into account the determined orientation of the antenna.

29. Steerable directional antenna apparatus according to claim 28, comprising a gyroscope and wherein the controller is configured to determine an orientation of the antenna taking into account sensor data from the gyroscope.

30. Steerable directional antenna apparatus comprising:
a steerable directional antenna for communicating with a terrestrial electromagnetic signal source;
one or more proximity sensors;
a memory comprising location specific steering data comprising one or more steering data portions, each steering data portion being specific to a respective location; and
a controller comprising one or more computer processors, the controller being configured to: determine a location of the steerable directional antenna; select a steering data portion from the location specific steering data taking into account the determined location of the antenna; determine an adjusted principal communication direction of the steerable directional antenna taking into account the said selected steering data portion; and adjust the principal communication direction of the steerable directional antenna in accordance with the said adjusted principal communication direction,
wherein the memory further comprises location specific power level data comprising one or more power level data portions, each of the power level data portions being specific to each of one or more locations, the said power level data portions being indicative of respective power level configurations of one or more antenna amplifiers configured to adjust a power level of signals to be transmitted and/or received by the antenna;
and wherein the controller is further configured to: select a power level data portion from the said power level data taking into account the determined location of the antenna; determine a power level configuration of the antenna amplifier(s) taking into account the selected power level data portion; and configure the antenna amplifier(s) in accordance with the said determined power level configuration, and to select the said steering data portion from the location specific steering data, and/or determine the said adjusted principal communication direction of the steerable directional antenna, taking into account sensor data from the one or more proximity sensors.

31. Steerable directional antenna apparatus comprising:
a steerable directional antenna for communicating with a terrestrial electromagnetic signal source;
one or more pressure sensors and/or one or more temperature sensors.
a memory comprising location specific steering data comprising one or more steering data portions, each steering data portion being specific to a respective location; and
a controller comprising one or more computer processors, the controller being configured to: determine a location of the steerable directional antenna; select a steering data portion from the location specific steering data taking into account the determined location of the antenna; determine an adjusted principal communication direction of the steerable directional antenna taking into account the said selected steering data portion; and adjust the principal communication direction of the steerable directional antenna in accordance with the said adjusted principal communication direction, wherein the memory further comprises location specific power level data comprising one or more power level data portions, each of the power level data portions being specific to each of one or more locations, the said power level data portions being indicative of respective power level configurations of one or more antenna amplifiers configured to adjust a power level of signals to be transmitted and/or received by the antenna;

and wherein the controller is further configured to: select a power level data portion from the said power level data taking into account the determined location of the antenna; determine a power level configuration of the antenna amplifier(s) taking into account the selected power level data portion; and configure the antenna amplifier(s) in accordance with the said determined power level configuration, and to select the said steering data portion from the location specific steering data and/or determine the said adjusted principal communication direction of the steerable directional antenna taking into account sensor data from the one or more pressure sensors and/or one or more temperature sensors.

32. Steerable directional antenna apparatus comprising: a steerable directional antenna; a memory; and a controller comprising one or more computer processors, the controller being configured to: determine a location of the antenna; adjust a principal communication direction of the antenna to thereby provide a wireless communications link between the antenna and a terrestrial electromagnetic signal source meeting one or more link criteria; and store in the memory the said location together with a steering data portion related to, or derived from, the said adjusted principal communication direction, and to determine an orientation of the antenna; and store data representing the said orientation of the antenna together with said steering data portion and location.

* * * * *